(12) United States Patent
Saiki

(10) Patent No.: US 7,961,259 B2
(45) Date of Patent: Jun. 14, 2011

(54) IMAGING APPARATUS

(75) Inventor: Junichi Saiki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1325 days.

(21) Appl. No.: 11/467,775

(22) Filed: Aug. 28, 2006

(65) Prior Publication Data

US 2007/0058065 A1    Mar. 15, 2007

(30) Foreign Application Priority Data

Sep. 9, 2005    (JP) ............................... P2005-261485

(51) Int. Cl.
*H04N 5/64* (2006.01)
(52) U.S. Cl. ...................................................... 348/836
(58) Field of Classification Search .................... 348/61, 348/836
See application file for complete search history.

(56) References Cited

U.S. PATENT DOCUMENTS 5,404,182 A * 4/1995 Nomura ........................ 348/836

FOREIGN PATENT DOCUMENTS

| JP | 2004-112553 | 4/2004 |
| JP | 2004-216976 | 8/2004 |

* cited by examiner

*Primary Examiner* — Allen Wong
(74) *Attorney, Agent, or Firm* — Oblon, Spivak, McClelland, Maier & Neustadt, L.L.P.

(57) ABSTRACT

An imaging apparatus includes: a camera having a lens barrel incorporating an imaging device and a photographic optical system for introducing a subject image to the imaging device; a bracket for supporting the camera; a guide member attached onto the camera, the guide member having a cylindrical surface extending about an axis of the lens barrel in a state in which the guide member is attached on the camera; a plurality of bearing members provided to the bracket and supporting the cylindrical surface so that the cylindrical surface is rotatable about the axis of the lens barrel; and a fixing device for fixing the camera to the bracket.

12 Claims, 20 Drawing Sheets

IMAGING APPARATUS

CROSS REFERENCES TO RELATED APPLICATIONS

The present invention contains subject matter related to Japanese Patent Application JP 2005-261485 filed in the Japanese Patent Office on Sep. 9, 2005, the entire contents of which are incorporated herein by reference.

BACKGROUND OF THE INVENTION

1. Field of the Invention

The present invention relates to an imaging apparatus.

2. Description of the Related Art

There are monitoring apparatuses that include an imaging apparatus having a camera and a bracket supporting the camera, and monitors images taken by the camera on a monitor.

In monitoring apparatuses for monitoring over a large area, the camera is rocked vertically or turned around the vertical axis to obtain a plurality of image data in succession, and the plurality of image data are arranged vertically and horizontally side by side and synthesized to generate image data covering a large area.

On the other hand, since the imaging region of an imaging device incorporated into the camera has a rectangular shape, the contour of the image data obtained by the imaging device also has a rectangular shape.

Accordingly, when arranging the plurality of image data vertically and horizontally side by side for image synthesis, if the longitudinal sides of the contour of the image data are not parallel to the vertical axis (if the transverse sides are not perpendicular to the vertical axis), there is a disadvantage in that the synthesized image data is inclined with respect to the vertical axis.

Therefore, in order to make the longitudinal sides of the contour of the image data obtained with the camera parallel to the vertical axis (to make the transverse sides perpendicular to the vertical axis), it is necessary to adjust the rotational position of the camera about the axis of the lens barrel (about the optical axis of the photographic optical system), with respect to the bracket in advance.

As an example of related art for adjusting the position of the camera, there has been proposed one in which the camera is rockably coupled to the bracket using a screw and a screw hole, and the rocking position of the camera is adjusted (Japanese Unexamined Patent Application Publication No. 2004-216976).

SUMMARY OF THE INVENTION

However, with the related art as described above, due to its inherent structure, it is difficult to adjust the rotational position of the camera about the axis of the lens barrel (about the optical axis of the photographic optical system).

It is desirable to easily adjust the rotational position of the camera about the axis of the lens barrel.

According to an embodiment of the present invention, there is provided an imaging apparatus including: a camera having a lens barrel incorporating an imaging device and a photographic optical system for introducing a subject image to the imaging device; a bracket for supporting the camera; a guide member attached onto the camera, the guide member having a cylindrical surface extending about an axis of the lens barrel in a state in which the guide member is attached on the camera; a plurality of bearing members provided to the bracket and supporting the cylindrical surface so that the cylindrical surface is rotatable about the axis of the lens barrel; and fixing means for fixing the camera to the bracket.

According to the embodiment of the present invention, the guide member having the cylindrical surface is attached onto the camera, and the cylindrical surface is supported by the bearing members, which are provided to the bracket, so as to be rotatable about the axis of the lens barrel.

Accordingly, the rotational position of the camera about the axis of the lens barrel can be easily and reliably adjusted by means of a simple construction.

DESCRIPTION OF THE PREFERRED EMBODIMENTS

First Embodiment

A first embodiment of the present invention will now be described.

Figure 1:
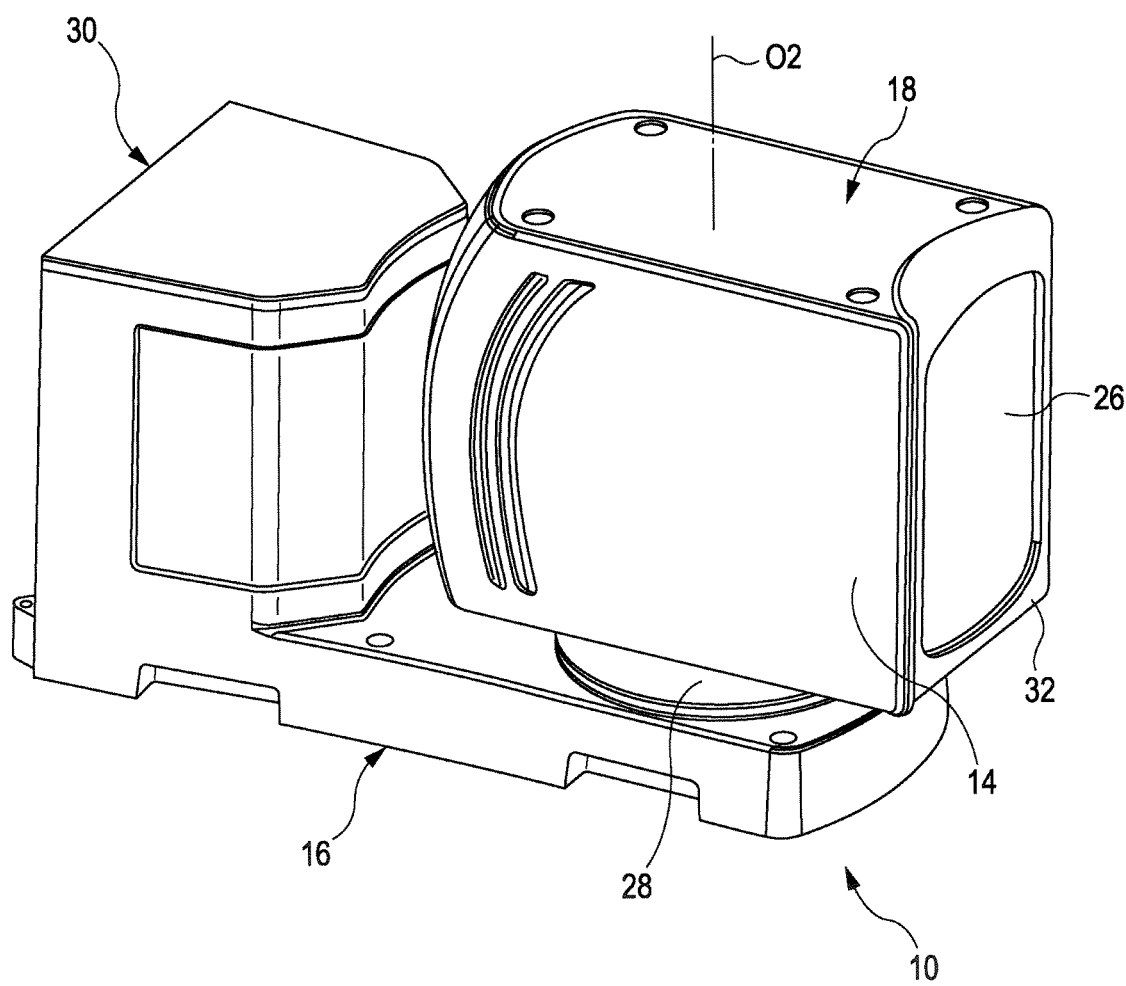
FIG. 1 is a perspective view, as seen from diagonally above, of an imaging apparatus according to a first embodiment of the present invention.
Figure 2:
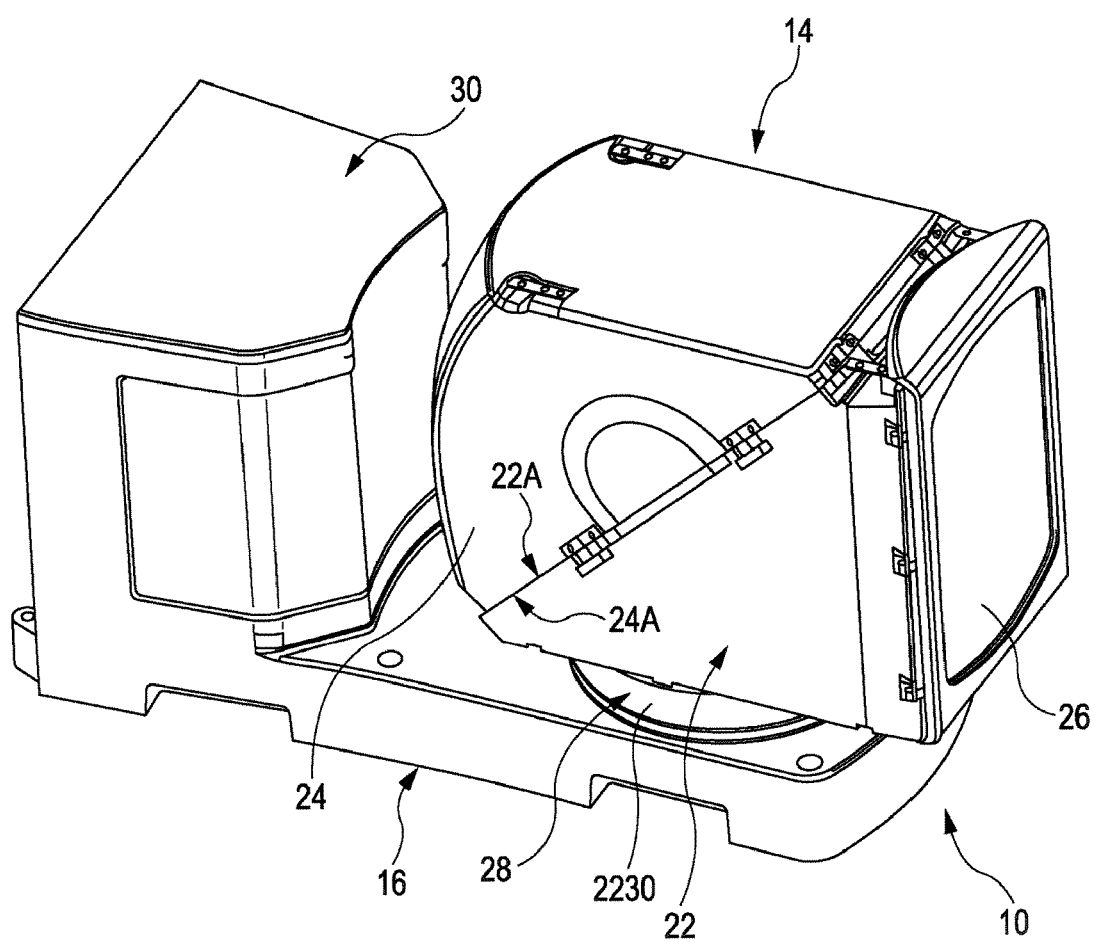
FIG. 2 is a perspective view showing a state in which a dressing cover is removed from the imaging apparatus.
Figure 3:
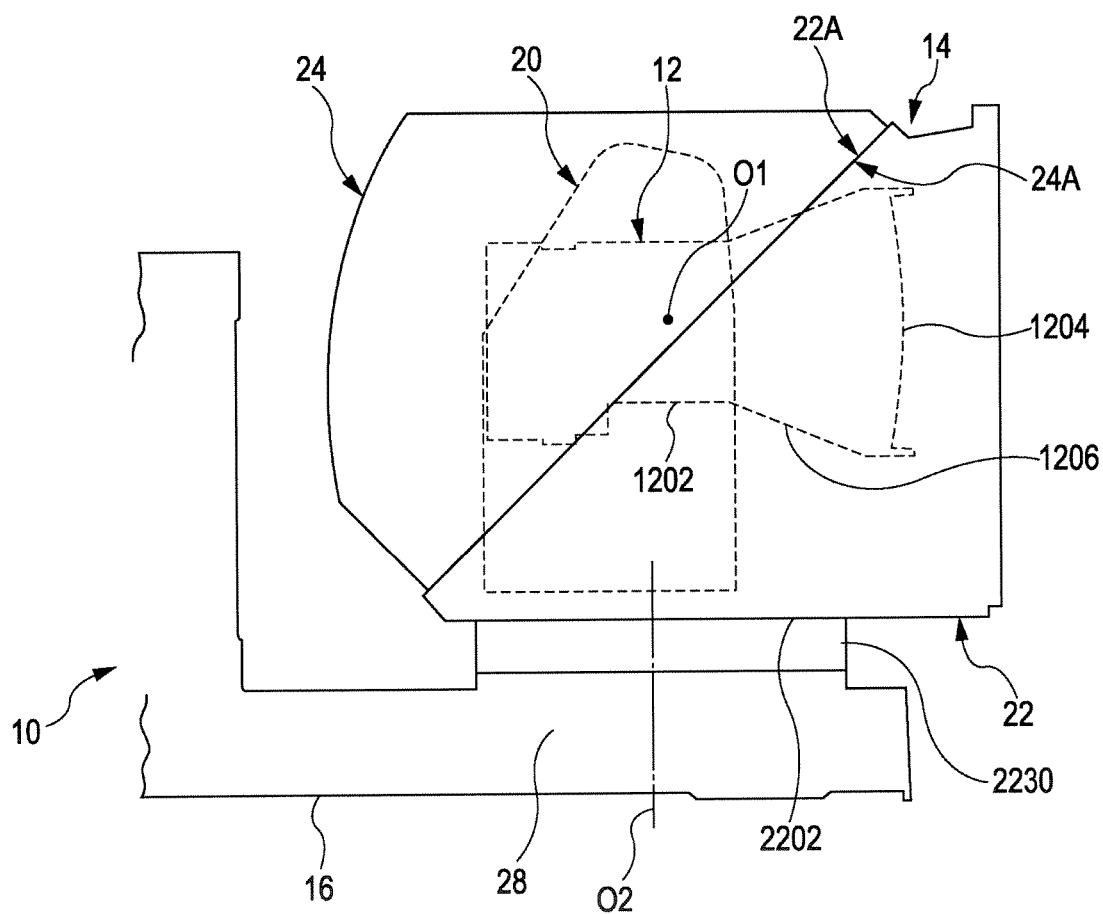
FIG. 3 is a side view showing the construction of the imaging apparatus.
Figure 4:
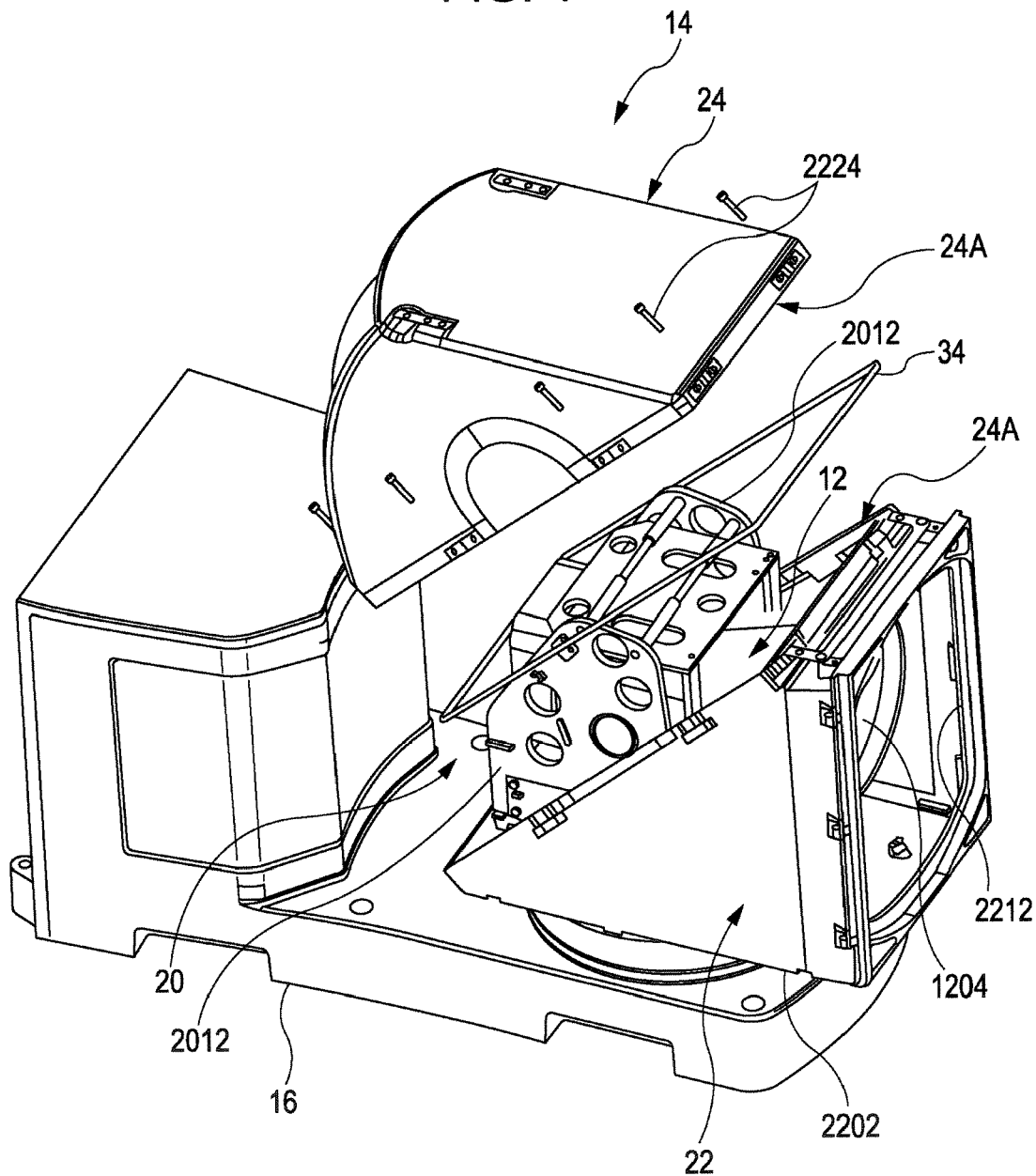
FIG. 4 is an exploded perspective view of the imaging apparatus.

FIG. 1 is a perspective view, as seen from diagonally above, of an imaging apparatus according to this embodiment, FIG. 2 is a perspective view of an imaging apparatus 10 with a dressing cover 18 removed, FIG. 3 is a side view showing the construction of the imaging apparatus 10, and FIG. 4 is an exploded perspective view of the imaging apparatus 10.

As shown in FIGS. 2 and 3, the imaging apparatus 10 includes a base 16, a waterproof case 14 provided on the base 16, and a turning mechanism 28 for turning the waterproof case 14 about a vertical axis O2.

The waterproof case 14 is provided with a camera 12 and a rocking mechanism 20 for vertically rocking the camera 12.

In this embodiment, the dressing cover 18 is attached onto the waterproof case 14.

As shown in FIG. 2, the waterproof case 14 and the dressing cover 18 are arranged on one side of the upper surface of the base 16, and a control box 30 is provided upright on the other side of the upper surface of the case 16.

The control box 30 accommodates a motor 2020 (see FIG. 5) of the rocking mechanism 20, a motor driver circuit for supplying a driving signal to a motor of the turning mechanism 28, a control circuit causing the camera 12 to perform zoom operation, a signal processing circuit for performing such processing as converting a video signal, which is output from an imaging device of the camera 12, into video data of a predetermined format, a communication circuit for performing exchange of the video data or a control command with a host device provided outside the imaging apparatus 10 via the Ethernet, a power supply circuit for converting externally supplied electric power into a predetermined voltage or current for supply to the respective circuits described above, and the like.

An Ethernet connector connected to the communication circuit, a power supply connector, and the like are provided on the back surface of the control box 30.

A cylindrical tubular wall 2230 protrudes integrally from a lower part of the waterproof case 14. The lower end of the tubular wall 2230 is joined to the base 16 through a sealant rotatably and in a fluid-tight manner, with the turning mechanism 28 being accommodated inside the tubular wall 2230.

Although none are shown in the drawings, the turning mechanism 28 includes a motor provided in the inner portion of the base 16, an output gear attached onto the output shaft of the motor, a driven gear provided to the lower end of the waterproof case 14, a gear mechanism coupling the output gear and the driven gear to each other, and the like. Various known structures may be employed as the turning mechanism 28 described above.

It should be noted that In this embodiment, the turning range of the waterproof case 14 by the turning mechanism 28 is 135 degrees (total of 270 degrees) to the right and left with respect to the front side.

As shown in FIGS. 2 to 4, the waterproof case 14 includes a front case 22 covering the front portion of the camera 12, and a rear case 24 covering the rear portion of the camera 12. The waterproof case 14 accommodates the camera 12 and the rocking mechanism 20 in a fluid-tight manner.

An opening 2212 is provided at the portion of the front case 22 facing the front of the camera 12. A light transmitting plate 26 for taking the image of a subject is attached over the opening 2212 in a fluid-tight manner.

As shown in FIG. 4, the front case 22 and the rear case 24 are detachably joined together at joining portions 22A and 24A.

The joining portion 22A of the front case 22 and the joining portion 24A of the rear case 24 are each formed in the form of a rectangular frame and extend on the same plane extending diagonally with respect to the vertical direction as viewed from the side of the camera 12.

The front case 22 and the rear case 24 are fastened together by means of screws 2224 with a sealant 34 being interposed between the joining portions 22A and 24A, whereby the respective joining portions 22A and 24A of the front case 22 and rear case 24 are joined together in a fluid-tight manner.

As shown in FIG. 1, the dressing cover 18 is provided so as to cover the portion of the waterproof case 14 excluding the front and bottom walls of the front case 22, thereby enhancing the outward appearance of the imaging apparatus 10.

The upper wall of the dressing cover 18 is attached onto the upper wall of the front case 22 and the upper wall of the rear case 24 with screws (not shown) or the like.

Figure 5:
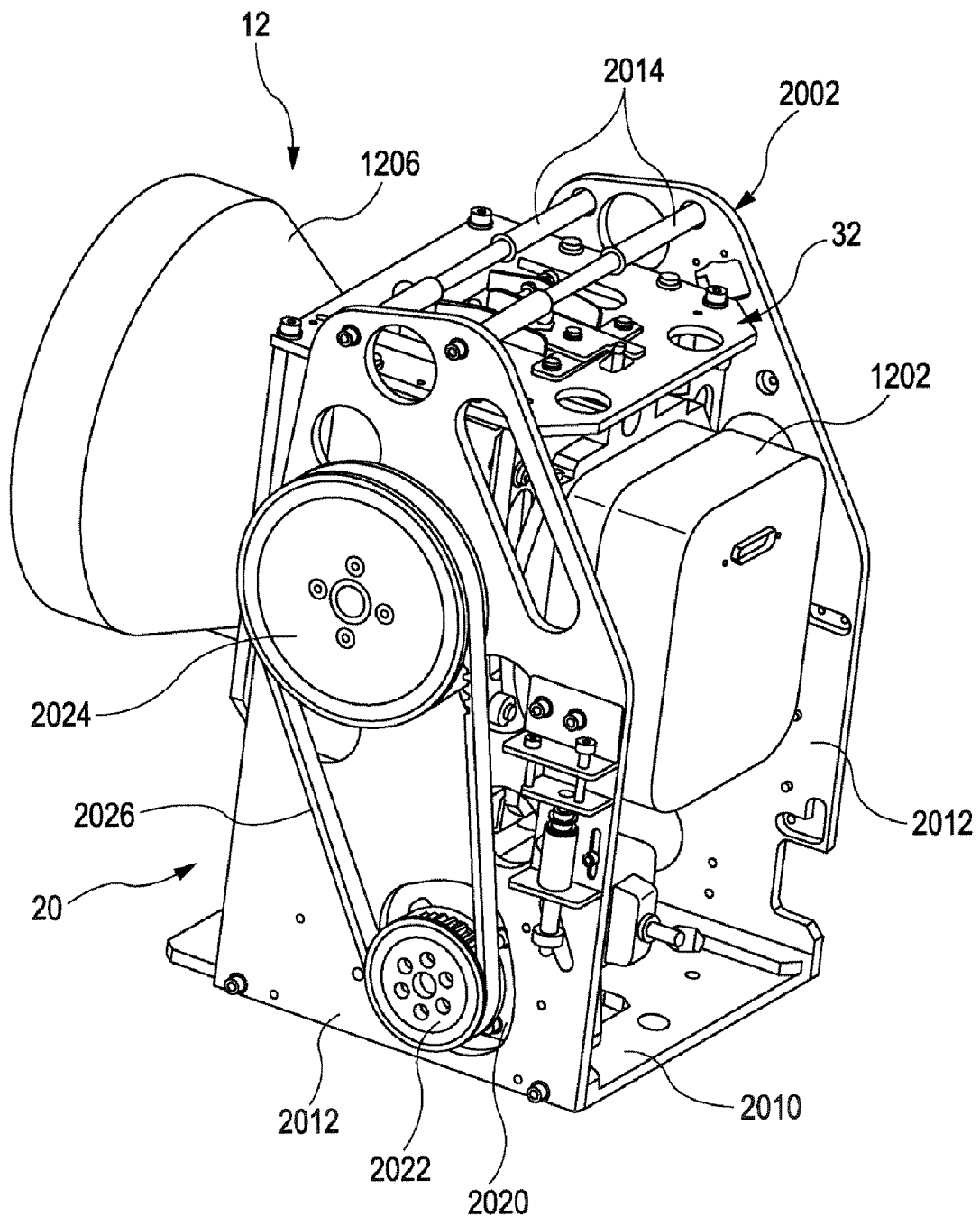
FIG. 5 is a perspective view of a camera and a rocking mechanism.
Figure 6:
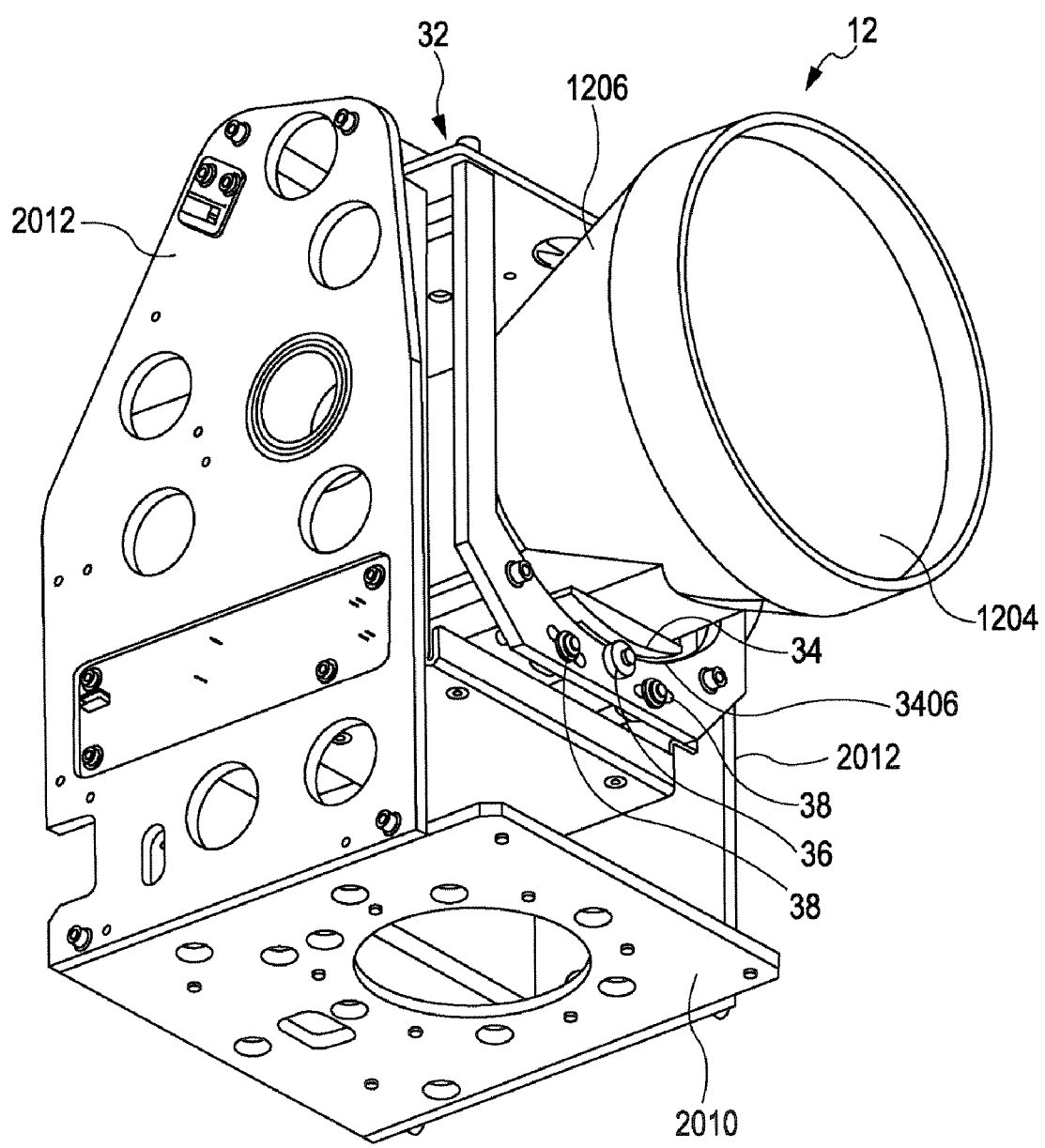
FIG. 6 is a perspective view of the camera and the rocking mechanism.

FIGS. 5 and 6 are perspective views of the camera 12 and rocking mechanism 20.

As shown in FIGS. 5 and 6, the rocking mechanism 20 has a frame 2002.

The frame 2002 includes a bottom plate 2010, side plates 2012 extending upright from both the right and left sides of the bottom plate 2010, rods 2014 connecting between the upper ends of the respective side plates 2012, and the like.

The bottom plate 2010 of the frame 2002 is attached onto a bottom wall 2202 (see FIG. 4) of the front case 22.

The camera 12 is rockably supported between the right and left side plates 2012, and is rocked vertically by the rocking mechanism 20.

In this embodiment, the rocking mechanism 20 includes the motor 2020, a pulley 2022 attached onto the output shaft of the motor 2020, a pulley 2024 provided to the side portion of the camera 12, a belt 2026 suspended over the pulleys 2022 and 2024, and the like. The motor 2020 is arranged on the inner sides of the right and left side plates 2012, and the pulleys 2022 and 2024, and the belt 2026 are arranged on the outer side of the left side plate 2012.

As shown in FIG. 3, the camera 12 is adapted to rock within the vertical plane about a rocking axis O1 through drive of the motor 2020. Various known structures may be employed as the rocking mechanism 20 as described above.

In this embodiment, the rocking range of the camera 12 by the rocking mechanism 20 is 10 degrees upwards and 20 degrees downwards with respect to the horizontal direction.

Figure 7:
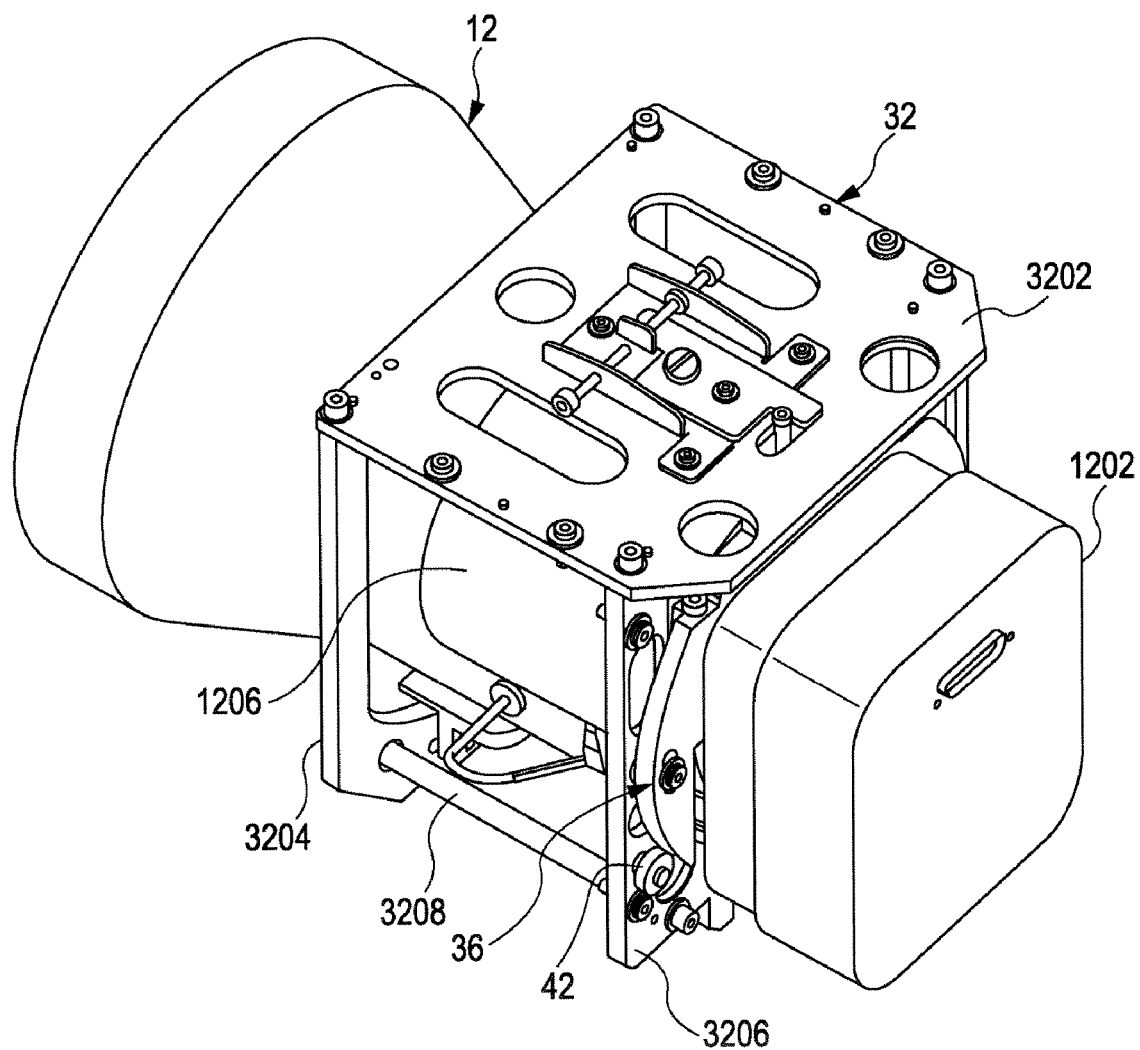
FIG. 7 is a perspective view showing the construction of the portion near the camera.
Figure 8:
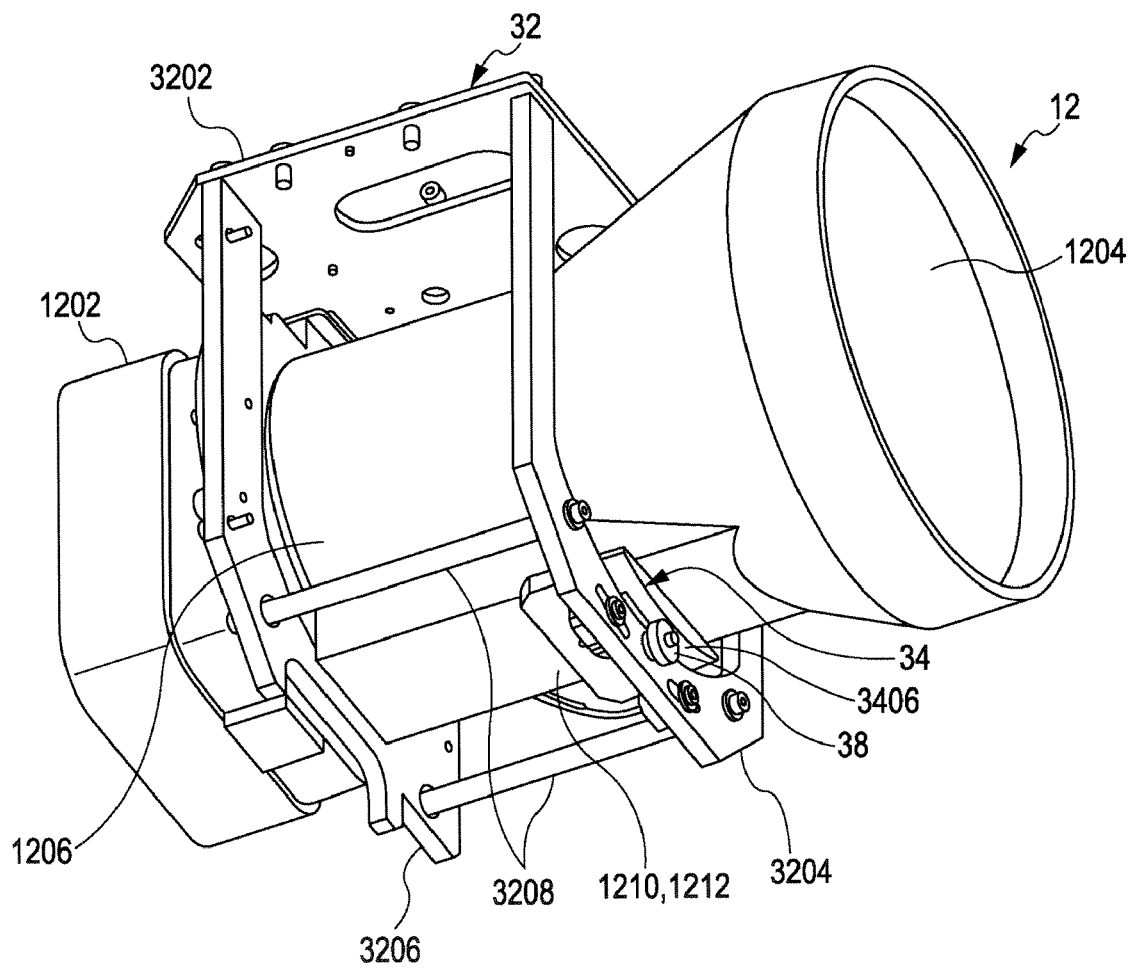
FIG. 8 is a perspective view showing the construction of the portion near the camera.
Figure 9:
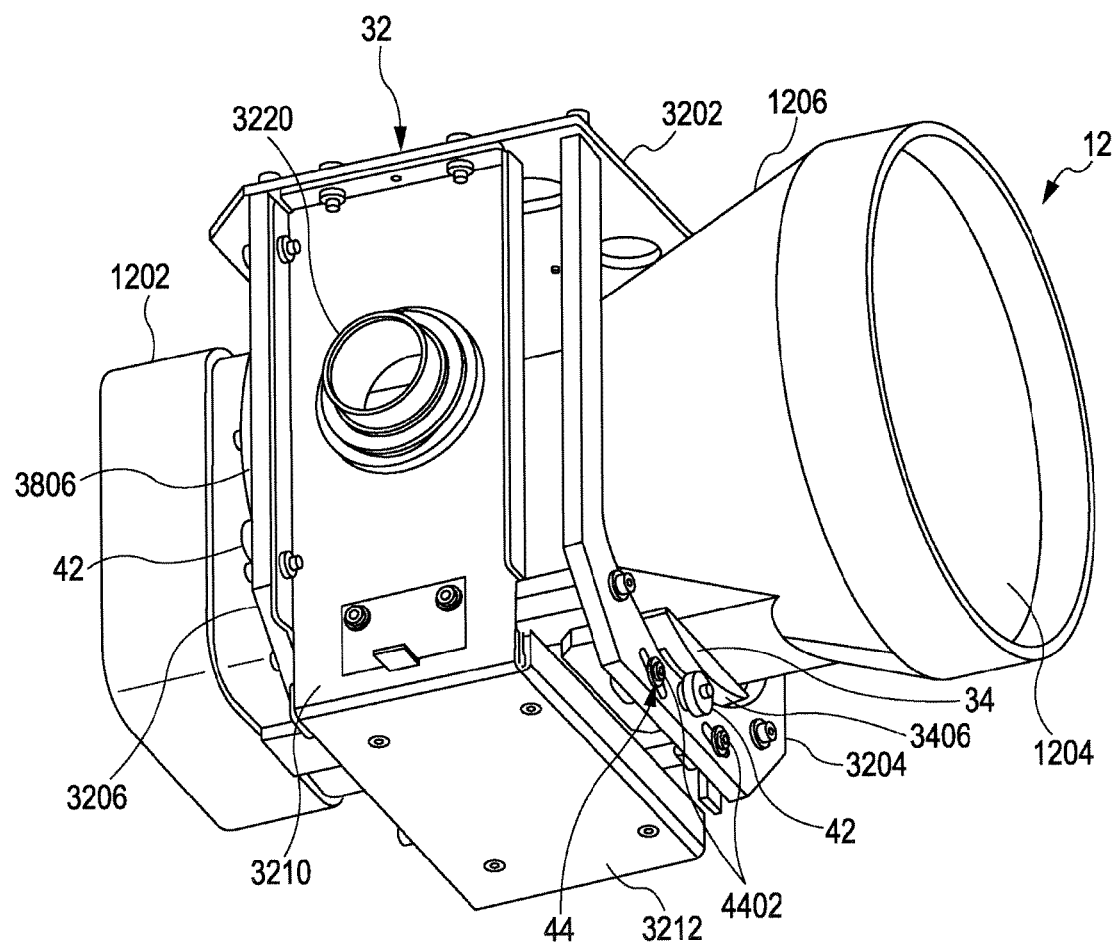
FIG. 9 is a perspective view of FIG. 7 with a side plate and a bottom plate mounted.
Figure 10:
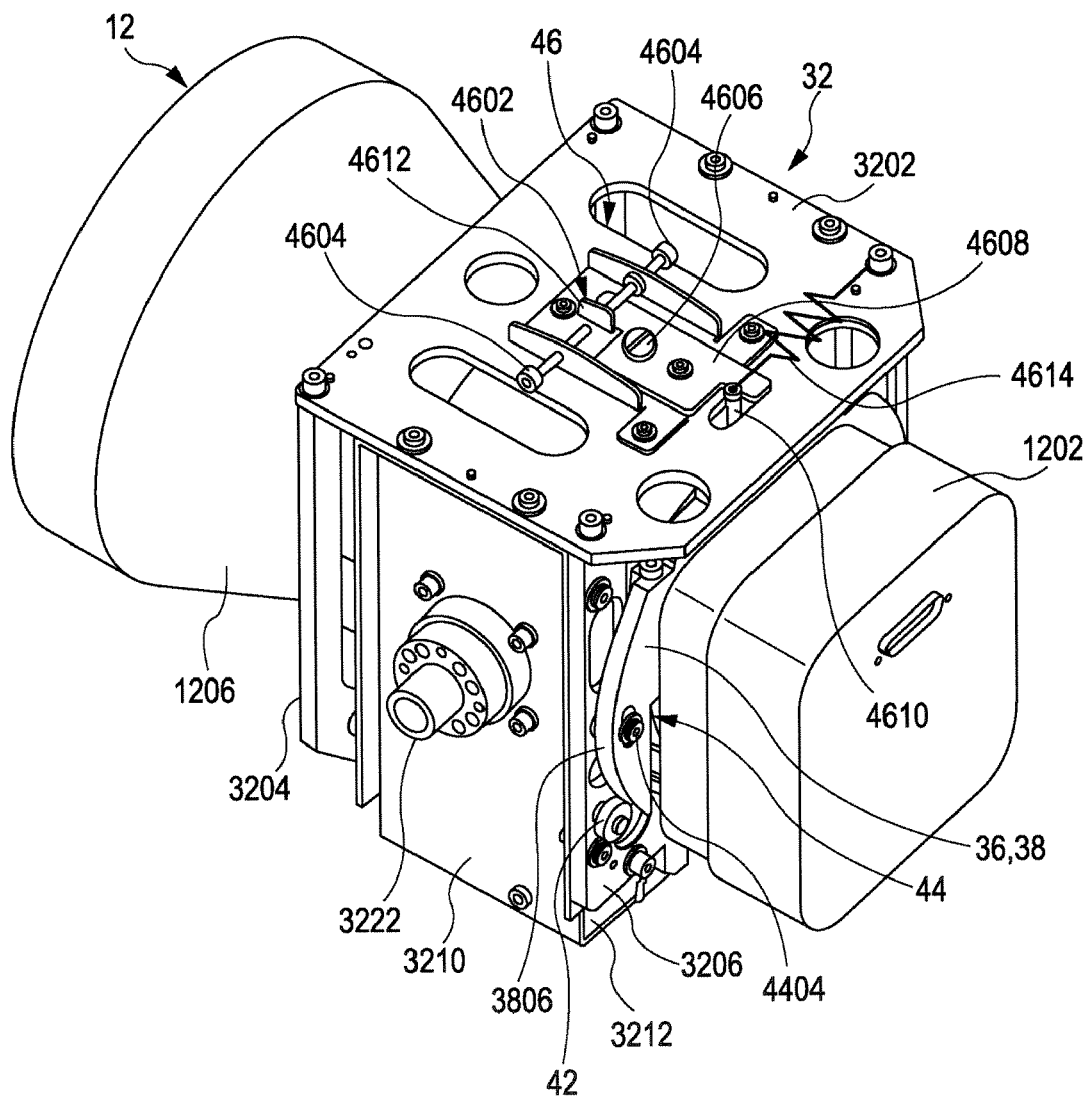
FIG. 10 is a perspective view of FIG. 8 with the side plate and the bottom plate mounted.

FIGS. 7 and 8 are perspective views of the construction in the vicinity of the camera 12, FIGS. 9 and 10 are perspective views showing a state in which side plates 3210 and a bottom plate 3212 are attached to the construction shown in FIGS. 7 and 8, and FIGS. 11 and 12 are perspective views of a bracket 32.

As shown in FIGS. 5 to 8, the camera 12 is coupled to the rocking mechanism 20 via the bracket 32, guide members 34 and 36, bearing members 42, and a fixing device 44.

The camera 12 includes a case 1202, a lens barrel 1206 protruding from the front surface of the case 1202 and accommodating a photographic optical system including a photographic lens 1204, an imaging device (not shown) such as a CCD or CMOS accommodated in the case 1202 and imaging a subject image captured by the photographic optical system, and the like.

As shown in FIG. 8, a mounting plate portion 1210 for mounting the camera 12 onto a tripod head or the like is provided in a lower part of the lens barrel 1206. A flat mounting surface 1212 facing downwards is formed in the mounting plate portion 1210. A mounting screw hole 1214 is formed in the mounting surface 1212. The mounting surface 1212 is formed with high precision with respect to the axis of the lens barrel 1206 and extends in the direction parallel to the axis of the lens barrel 1206.

Figure 17:
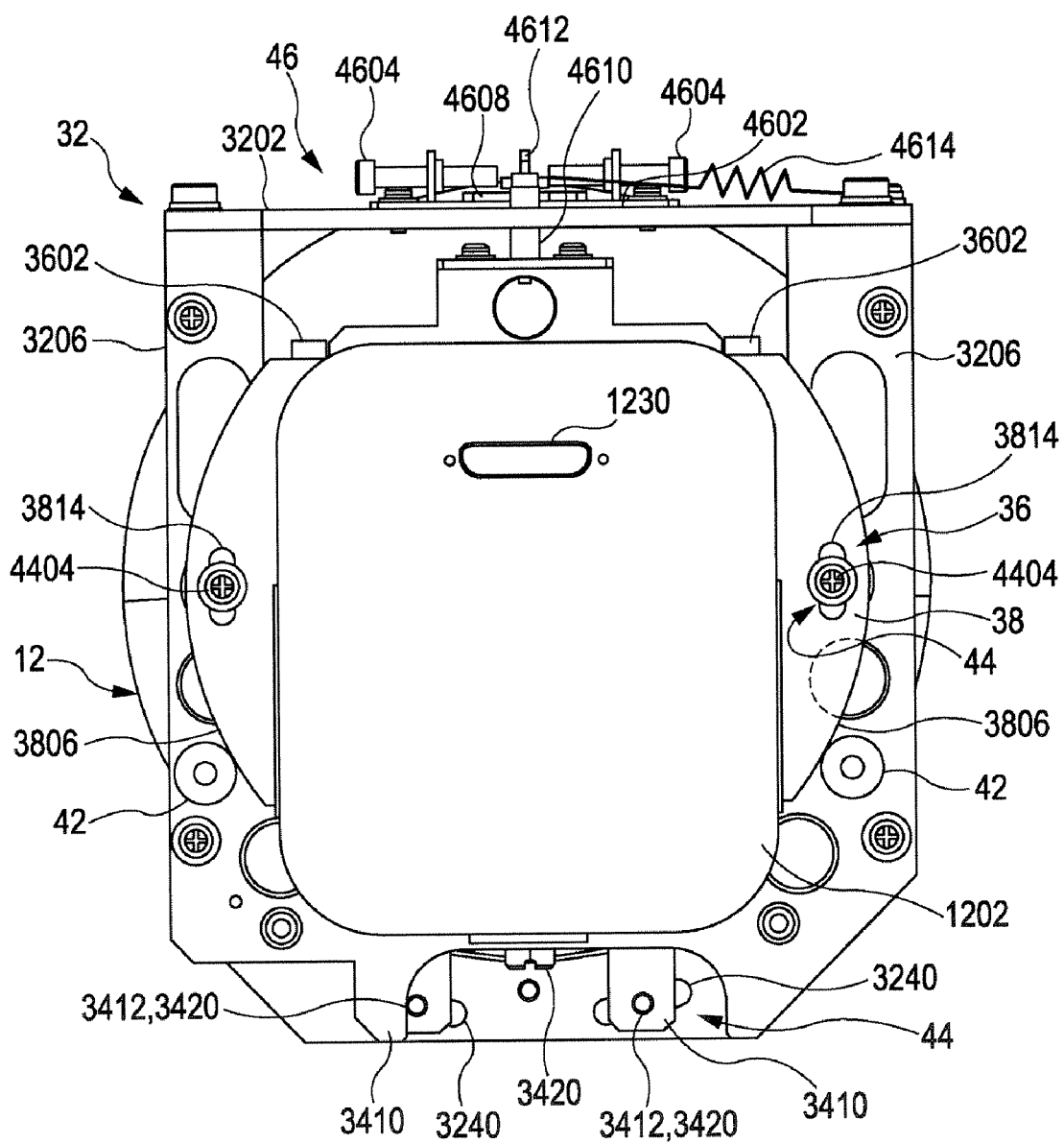
FIG. 17 is a view as seen in the direction of the arrow B of FIG. 15.

Further, as shown in FIG. 17, a connector 1230 for outputting an imaging signal output from the imaging device is provided to the rear surface of the case 1202. The connector 1230 and the signal processing circuit of the control box 30 are electrically connected to each other via a cable (not shown).

As shown in FIGS. 7, 8, 11, and 12, the bracket 32 includes an upper plate 3202, front and rear plates 3204 and 3206 extending upright from the front and rear of the upper plate 3202, respectively, and two rods 3208 connecting between the lower ends of the front and rear plates 3204 and 3206.

A rotation adjusting mechanism 46, which will be described later, is provided in the upper surface of the upper plate 3202.

Figure 11:
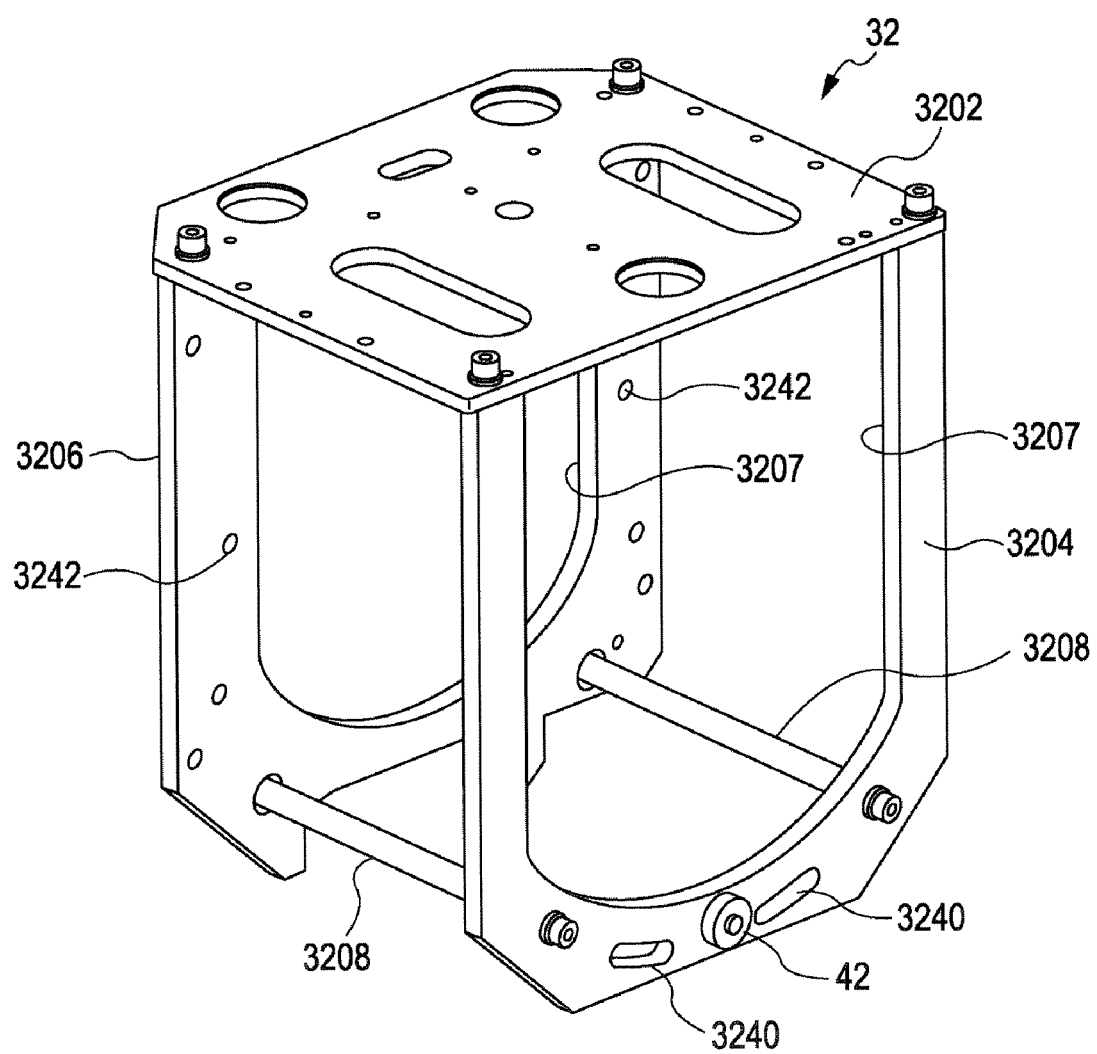
FIG. 11 is a perspective view of a bracket.
Figure 12:
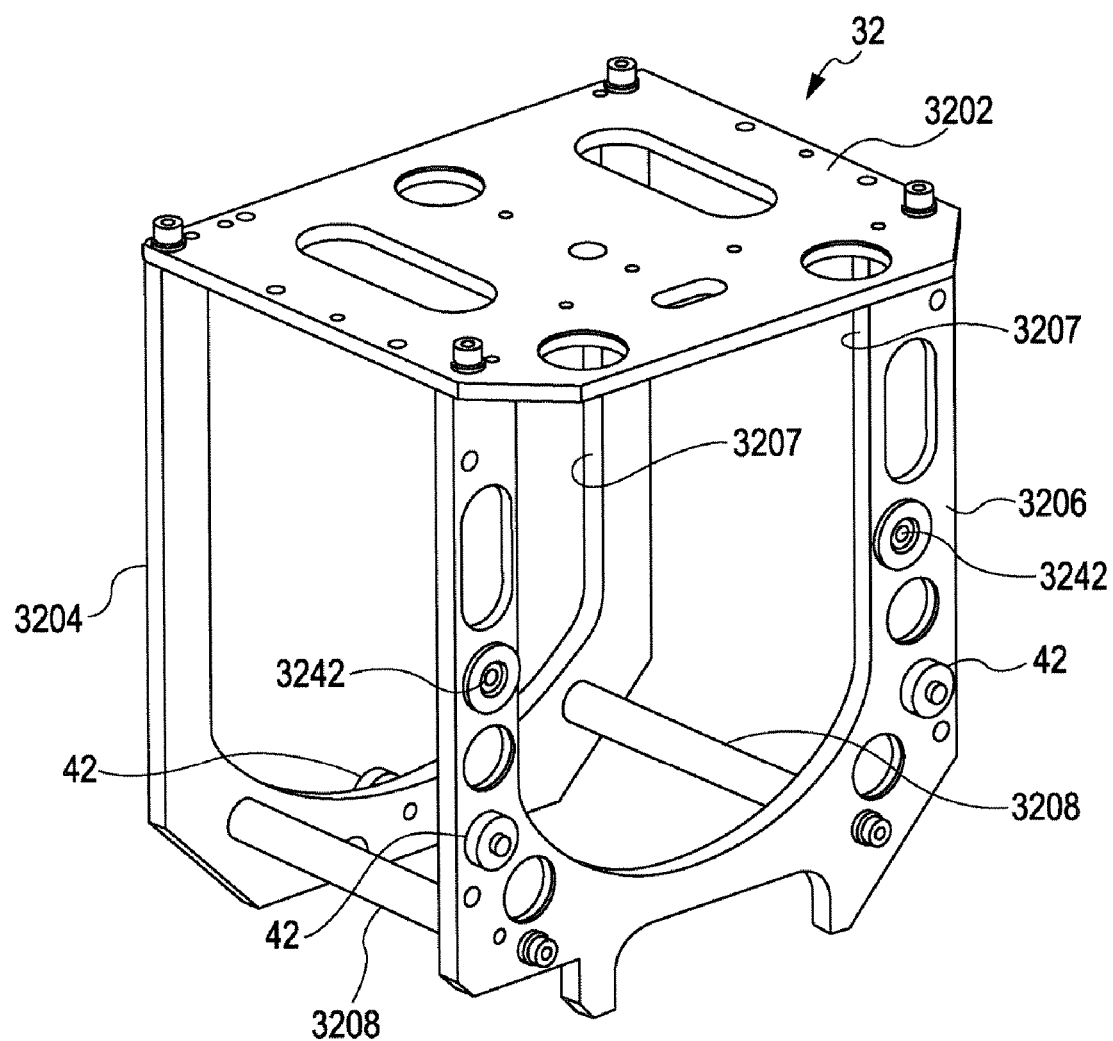
FIG. 12 is a perspective view of the bracket.

As shown in FIGS. 11 and 12, an opening 3207, through which the lens barrel 1206 of the camera 12 is passed, is formed in each of the front plate 3204 and rear plate 3206.

As shown in FIG. 11, elongated holes 3240 extending laterally in an arcuate shape are formed at two locations on the right and left with the center of the lower part of the front plate 3204 therebetween.

Further, screw holes 3242 are formed on both the right and left sides at the vertically intermediate position of the rear plate 3206.

As shown in FIGS. 9 and 10, the right and left side plates 3210 vertically extend from the right and left sides of the upper plate 3202 between the front plate 3204 and the rear plate 3206. The lower ends of the right and left side plates are connected to the bottom plate 3212 below the rods 3208.

Support shafts 3220 and 3222 centered about the rocking axis O1 respectively protrude on the outer sides of the right and left side plates 3210. The support shafts 3220 and 3222 are rotatably supported on bearings (not shown) provided on the right and left side plates 2012 of the rocking mechanism 20, thereby making the bracket 32 rotatable about the rocking axis O1.

Further, the above-described pulley 2024 (see FIG. 5) is attached onto the distal end of the support shaft 3222 on the right side.

Figure 13:
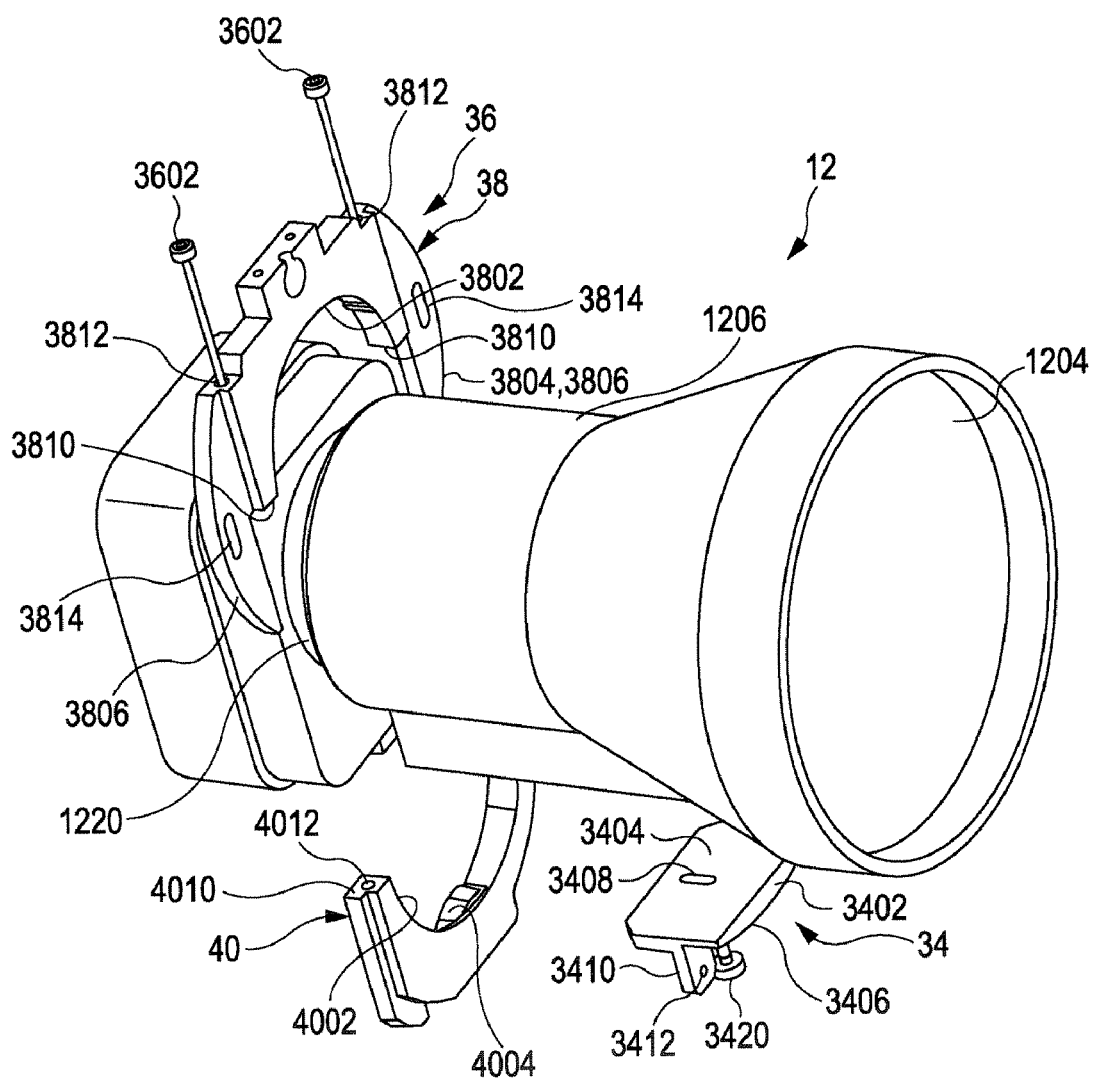
FIG. 13 is an explanatory view showing how guide members are mounted to the camera.
Figure 14:
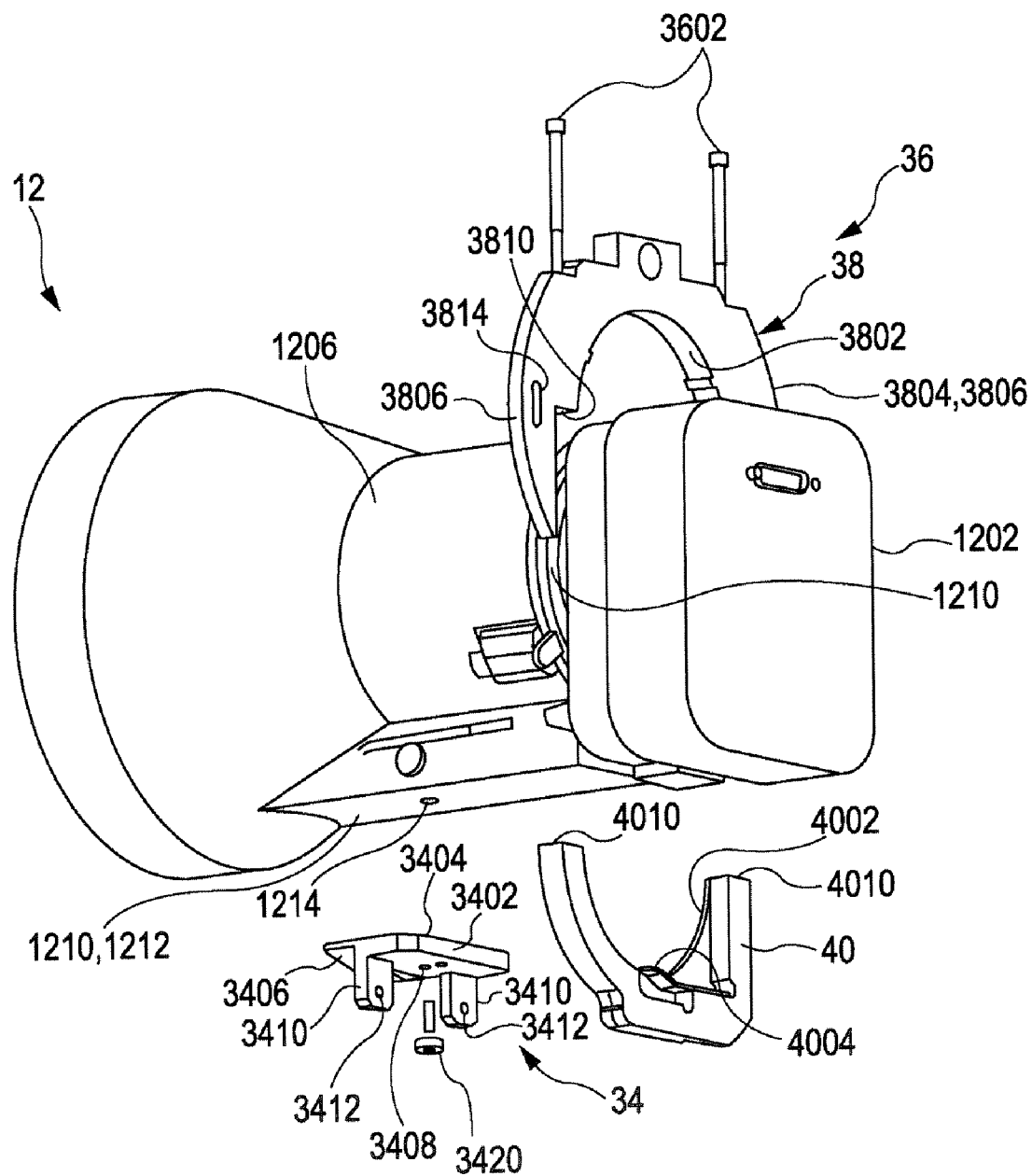
FIG. 14 is an explanatory view showing how the guide members are mounted to the camera.

FIGS. 13 and 14 are explanatory views showing how the guide members are mounted to the camera 12.

As shown in FIGS. 13 and 14, in this embodiment, the guide members are provided at two locations, that is, the intermediate position in the optical axis direction of the lens barrel 1206 and the base portion of the lens barrel 1206.

The guide member 34 mounted at the intermediate portion in the optical axis direction of the lens barrel 1206 has a main body 3402 having a length that is larger in dimension than the width thereof.

A mounting surface 3404 as a flat surface is formed in one surface of the main body 3402, and a cylindrical surface 3406 extending in an arcuate shape in the direction of the length described above is formed in the other surface of the main body 3402.

Further, a screw insertion hole 3408 is formed at the center of the main body 3402 so as to extend through the main body 3402 from the mounting surface 3404 to the cylindrical surface 3406. Mounting members 3410 protrude from both sides of the cylindrical surface 3406, with a screw hole 3412 being provided in each of the mounting members 3410.

The length of the guide member 34 extends in the direction perpendicular to the plane including the optical axis of the lens barrel 1206. The mounting surface 3404 is attached onto the mounting surface 1212 of the mounting plate portion 1210 by passing a screw 3420 through the screw insertion hole 3408 for threaded engagement with the screw hole 1214.

With the guide member 34 being attached onto a mounting surface 1212 with the screw 3420, the cylindrical surface 3406 is located at the lower center on an imaginary cylindrical surface extending about the axis of the lens barrel 1206.

As shown in FIGS. 13 and 14, the guide member 36 mounted to the base portion of the lens barrel 1206 includes upper and lower split members 38 and 40.

The upper split member 38 has a semi-arcuate shape and includes a semi-cylindrical inner surface 3802 constituted by an inner diameter in conformity with the outer diameter of the base portion of the lens barrel 1206. Further, the upper split member 38 has cylindrical surfaces 3806 respectively formed at two locations spaced (spaced by 120 degrees in this embodiment) from each other in the circumferential direction of an outer surface 3804 thereof.

Further, formed at portions close to the ends of the semi-arcuate upper split member 38 are mounting surfaces 3810 for fastening onto the lower split member 40. Further, bolt insertion holes 3812 are formed in parallel to each other and extend through the upper split member 40 so that the bolt insertion holes 3812 pass by the side of the base portion of the lens barrel 1206 and are open to the mounting surfaces 3810 on both sides.

Further, elongated holes 3814 extending vertically in an arcuate shape are respectively formed on both sides of the upper split member 38.

The lower split member 40 has a semi-arcuate shape and includes a semi-cylindrical inner surface 4002 constituted by an inner diameter in conformity with the outer diameter of the base portion of the lens barrel 1206.

A spring 4004 is provided at the circumferentially central portion of the inner surface 4002. When the guide member 36 is mounted onto the outer periphery of the base portion of the lens barrel 1206, the spring 4004 comes into elastic contact with the outer periphery of the base portion of the lens barrel 1206, thereby preventing a force greater than the elastic force of the spring 4004 from being applied to the lens barrel 1206. The spring 4004 thus serves to protect the lens barrel 1206.

Further, formed at portions close to the ends of the semi-arcuate lower split member 40 are mounting surfaces 4010 for fastening onto the upper split member 38.

The mounting surface 4010 of the lower split member 40 is provided so as to be capable of abutting the mounting surface 3810 of the upper split member 38. A screw hole 4012 is formed in each of the mounting surfaces 4010.

The guide member 36 sandwiches the outer periphery of the base portion of the lens barrel 1206 between the inner surfaces 3802 and 4002 of the upper and lower split members 38 and 40, respectively. The guide member 36 is attached onto the base portion of the lens barrel 1206 when, with the mounting surfaces 3810 and 4010 being opposed to each other, bolts 3602 are passed through the bolt insertion holes 3812 into threaded engagement with screw holes 4012. In this state, the cylindrical surfaces 3806 are located on both the right and left sides of the lower half portion of an imaginary cylindrical surface extending about the axis of the lens barrel 1206. That is, in this embodiment, the cylindrical surface 3406 of the guide member 34, and the two cylindrical surfaces 3806 of the guide member 36 are provided in the lower half portion of the lens barrel 1206 at a plurality of locations spaced from each other in the axial and circumferential directions of the lens barrel 1206.

It should be noted that in this state, the spring 4004 is held in elastic contact with the outer periphery of the base portion of the lens barrel 1206, and the camera 12 is mounted in place with the outer periphery of the base portion of the lens barrel 1206 being abutted against the inner surface 3802 of the upper split member 38 due to the elastic force of the spring 4004.

In this embodiment, as shown in FIGS. 13 and 14, a recessed groove 1220 is formed in the outer periphery of the base portion of the lens barrel 1206. With the upper and lower split members 38 and 40 being fitted in the recessed groove 1220, and the respective inner surfaces 3802 and 4002 of the upper and lower split members 38 and 40 abutting against the bottom surface of the recessed groove 1220, the guide member 36 is mounted to the camera 12 so that the guide member 36 is unable to move in the optical axis direction.

Figure 15:
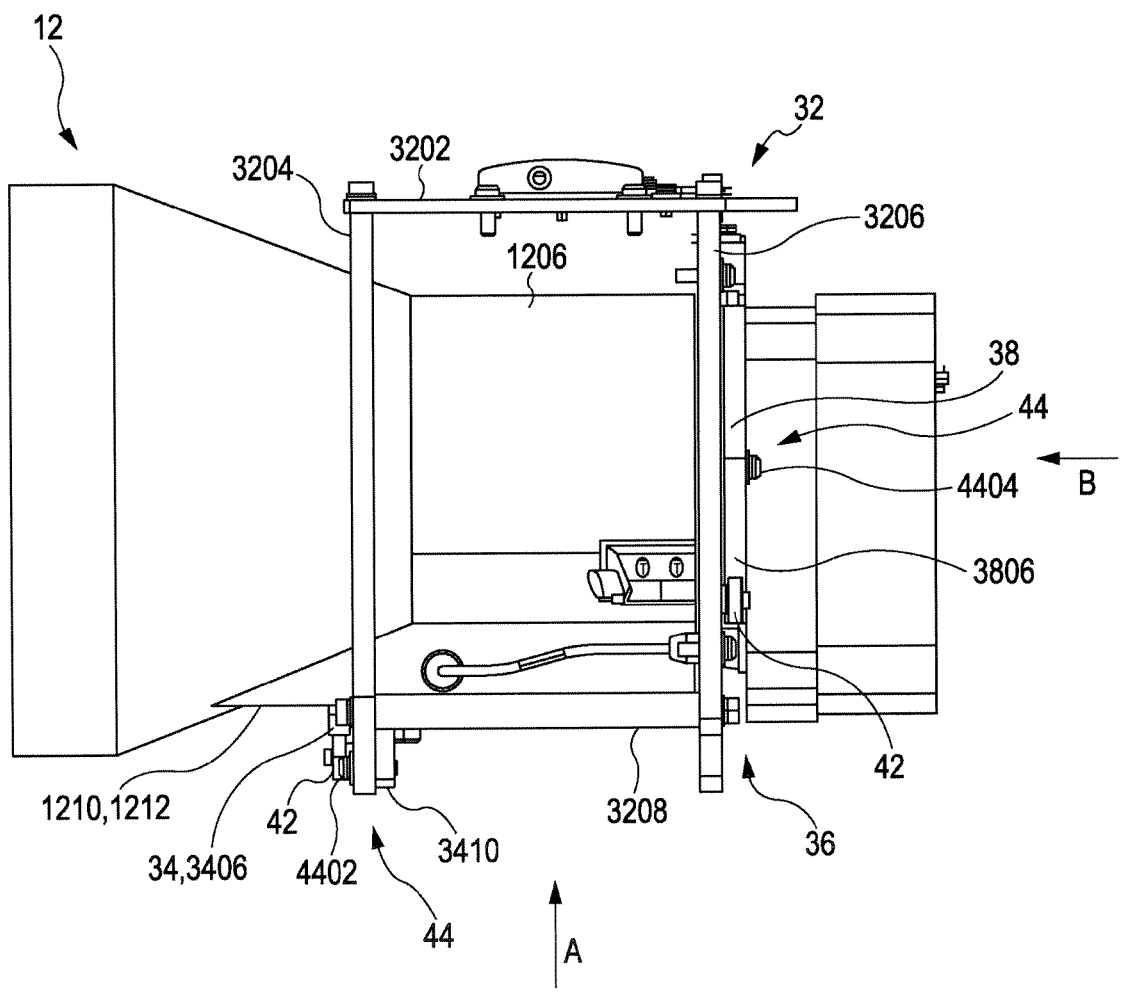
FIG. 15 is a side view showing a state in which the camera and the bracket are incorporated.
Figure 16:
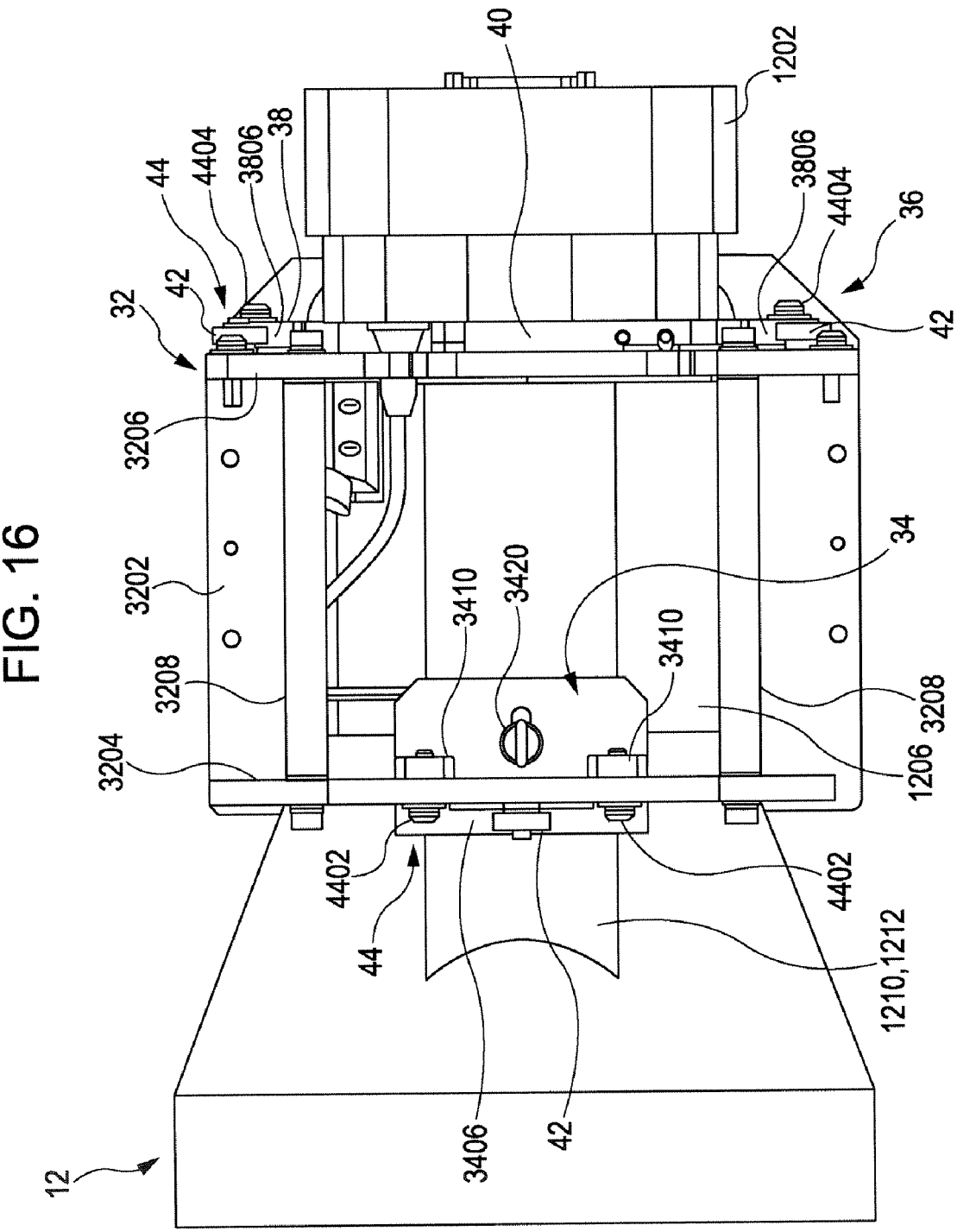
FIG. 16 is a view as seen in the direction of the arrow A of FIG. 15.

FIG. 15 is a side view showing a state in which the camera 12 and the bracket 32 are incorporated, FIG. 16 is a view as seen in the direction of the arrow A of FIG. 15, and FIG. 17 is a view as seen in the direction of the arrow B of FIG. 15.

As shown in FIGS. 9 to 12, in this embodiment, the bearing members 42 are each composed of a bearing (roller). There are provided three bearing members 42, which are rotatably attached onto the front plate 3204 and the rear plate 3206 with screws.

As shown in FIGS. 9, 11, 15, and 16, one bearing member 42 is provided at the lower center of the front surface of the front plate 3204, and supports the cylindrical surface 3406 of the guide member 34 so as to be rotatable about the axis of the lens barrel 1206.

As shown in FIGS. 10, 12, and 15 to 17, the other two bearing members 42 are provided on both sides of the rear surface of the rear plate 3206 close to the lower part thereof; more accurately, the other two bearing members 42 are provided at laterally symmetrical positions with respect to the vertical plane passing through the optical axis of the lens barrel 1206, and support the cylindrical surface 3806 of the guide member 36 so as to be rotatable about the axis of the lens barrel 1206.

It should be noted that the bearing members 42 used are not limited to the roller bearing but various known other structures such as slide bearing may be employed for the bearing members 42.

As shown in FIGS. 9, 10, and 15 to 17, the fixing device 44 includes two screws 4402, the two elongated holes 3240 of the front plate 3204, the two screw holes 3412 of the guide member 34, two screws 4404, the two elongated holes 3814 of the guide member 36, and the two screw holes 3242 of the rear plate 3406.

That is, by bringing the two screws 4402 into threaded engagement with the screw holes 3412 via the elongated holes 3240, the guide member 34 (camera 12) is non-rotatably fixed to the front plate 3204 (bracket 32).

Further, by bringing the two screws 4404 into threaded engagement with the screw holes 3242 via the elongated holes 3814, the guide member 36 (camera 12) is non-rotatably fixed to the front plate 3206 (bracket 32).

As shown in FIGS. 10 and 17, the rotation adjusting mechanism 46 includes a support plate 4602 attached onto the upper surface of the upper plate 3202 of the bracket 32, two adjust screws 4604 that are in threaded engagement with upright members on both the right and left sides of the support plate 4602 and are coaxially opposed to each other, a rocking plate 4608 provided on the support plate 4602 so as to be rockable about a support shaft 4606, a shaft 4610 extending upright from the upper part of the guide member 36 and passes through an elongated groove of the upper plate 3202 and protrudes on the upper plate 3202, and an urging member 4614 tensioned between the upper plate 3202 and the shaft 4612 and applying an urging force in the direction for bringing an end of the rocking plate 4608 and the shaft 4610 into abutment against each other.

An abutting plate portion 4612 is provided upright in the portion of the rocking plate 4608 where the two adjust screws 4604 face each other.

In the state where the above-mentioned fixation between the guide member 34 (camera 12) and the front plate 3204 (bracket 32) is released, and the above-mentioned fixation between the guide member 36 (camera 12) and the rear plate 3206 (bracket 32) is released, with respect to the abutting plate portion 4612, one of the adjust screws 4604 is retracted and the other adjust screw 4604 is advanced, thereby moving the abutting plate portion 4612 through the advancing motion of the other screw 4604.

Accordingly, the rocking plate 4608 is rocked about the support shaft 4606, the shaft 4610 is moved by the end portion of the rocking plate 4608, and the camera 12 is adjusted in its rotation about the axis of the lens barrel 1206 with respect to the bracket 32.

It should be noted that the construction of the rotation adjusting mechanism 46 is not limited to the structure of this embodiment but may take various other known structures.

Next, the adjusting operation of the camera 12 of the imaging apparatus 10 according to this embodiment will be described.

First, the base 16 of the imaging apparatus 10 is placed at the installation location. At this time, a chart in which horizontal and vertical lines are drawn is arranged in front of the camera 12.

Then, the Ethernet connector and power supply connector of the control box 30 of the imaging apparatus 10 are connected to the host device via cables so that an image taken by the camera 12 is displayed on the display of the host device.

Then, in order for the image of the chart to be displayed on the display, in accordance with a command from the host device, the camera 12 is rocked by the rocking mechanism 20, and the camera 12 is turned by the turning mechanism 28.

Further, the angle of the camera 12 about the axis of the lens barrel 1206 is adjusted so that the longitudinal sides of the contour of an image displayed on the display are parallel to the vertical axis of the chart (so that the transverse sides are perpendicular to the vertical axis).

Once the adjustment of the camera 12 is complete, the guide member 34 (camera 12) and the front plate 3204 (bracket 32) are fixed by fastening the screws 4402 of the fixing device 44, and the guide member 36 (camera 12) and the rear plate 3206 (bracket 32) are fixed by fastening the screws 4402 of the fixing device 44.

The adjusting operation of the camera 12 of the imaging apparatus 10 is thus completed.

According to this embodiment, by means of the simple construction in which the guide members 34 and 36 respectively having the cylindrical surfaces 3406 and 3806 are attached onto the camera 12, and the cylindrical surfaces 3406 and 3806 are supported on the bearing members 42 provided to the bracket 32 so as to be rotatable about the axis of the lens barrel 1206, the rotational position of the camera 12 about the axis of the lens barrel 1206 can be easily and reliably adjusted.

Accordingly, when, in particular, a plurality of image data are arranged in the vertical and horizontal directions and synthesized to produce image data covering a large area, this embodiment proves advantageous in obtaining image data of good quality suitable for synthesis of image data with no inclination with respect to the vertical or horizontal line.

Further, in this embodiment, there are provided a plurality of guide members, and the plurality of guide members are provided in the lower half portion of the lens barrel 1206 at a plurality of locations spaced apart from each other in the axial and circumferential directions of the lens barrel 1206. Accordingly, the camera 12 can be rotatably supported in a stable manner, which is advantageous in easily and reliably adjusting the rotational position of the camera 12 about the axis of the lens barrel 1206.

Second Embodiment

Next, a second embodiment of the present invention will be described.

The second embodiment differs from the first embodiment in the configuration of the camera, the configuration of the bracket, and the mounting structure of the guide members with respect to the camera. Otherwise, the second embodiment is of the same construction as the first embodiment.

Figure 18:
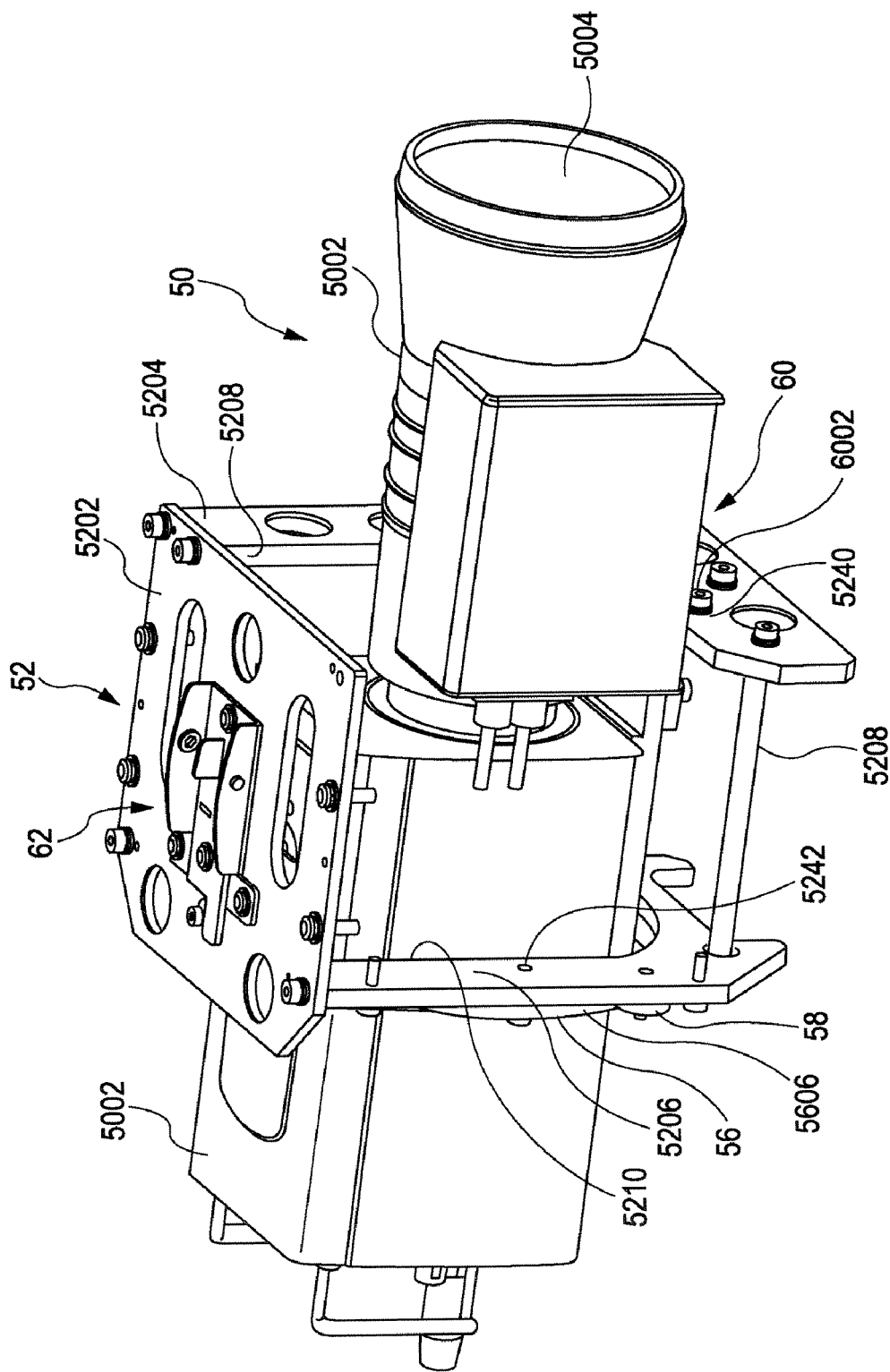
FIG. 18 is a perspective view showing the construction of the portion near a camera according to a second embodiment of the present invention.
Figure 19:
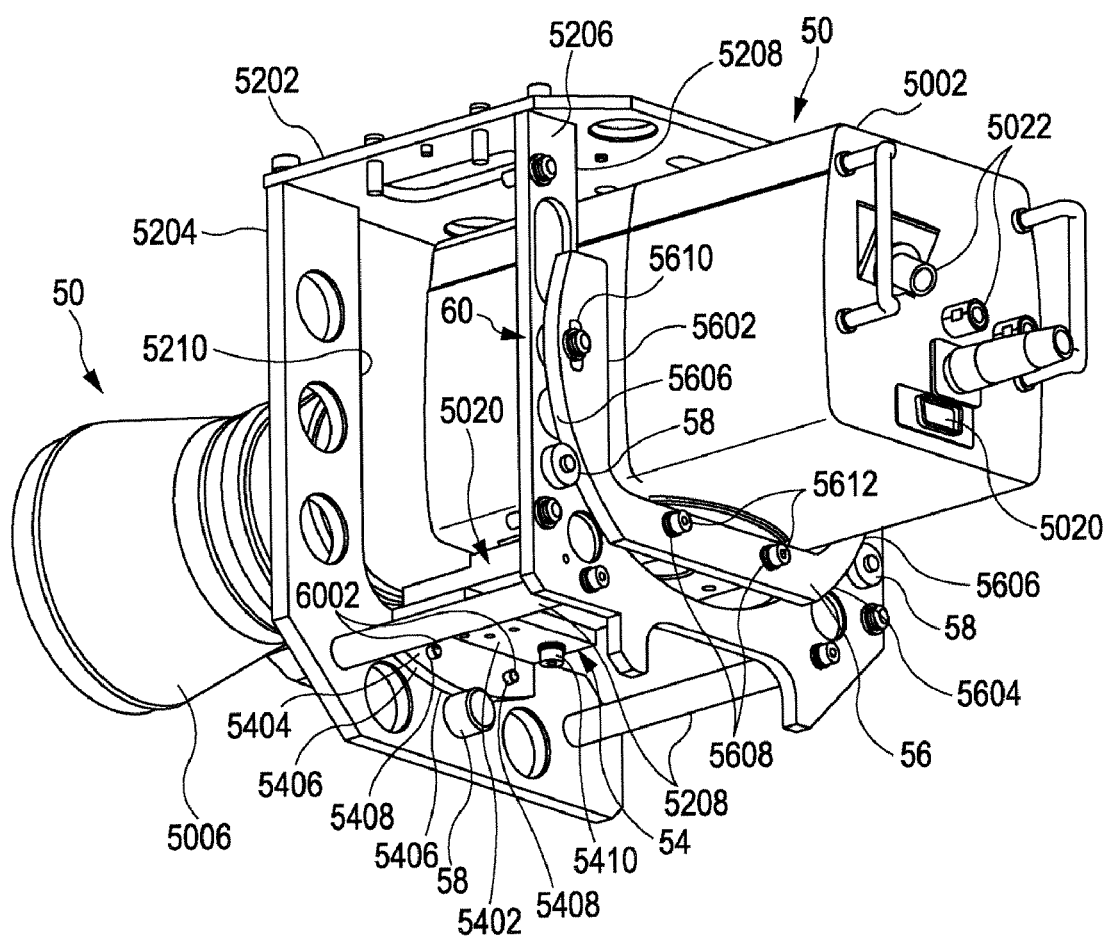
FIG. 19 is a perspective view showing the construction of the portion near the camera according to the second embodiment of the present invention.
Figure 20:
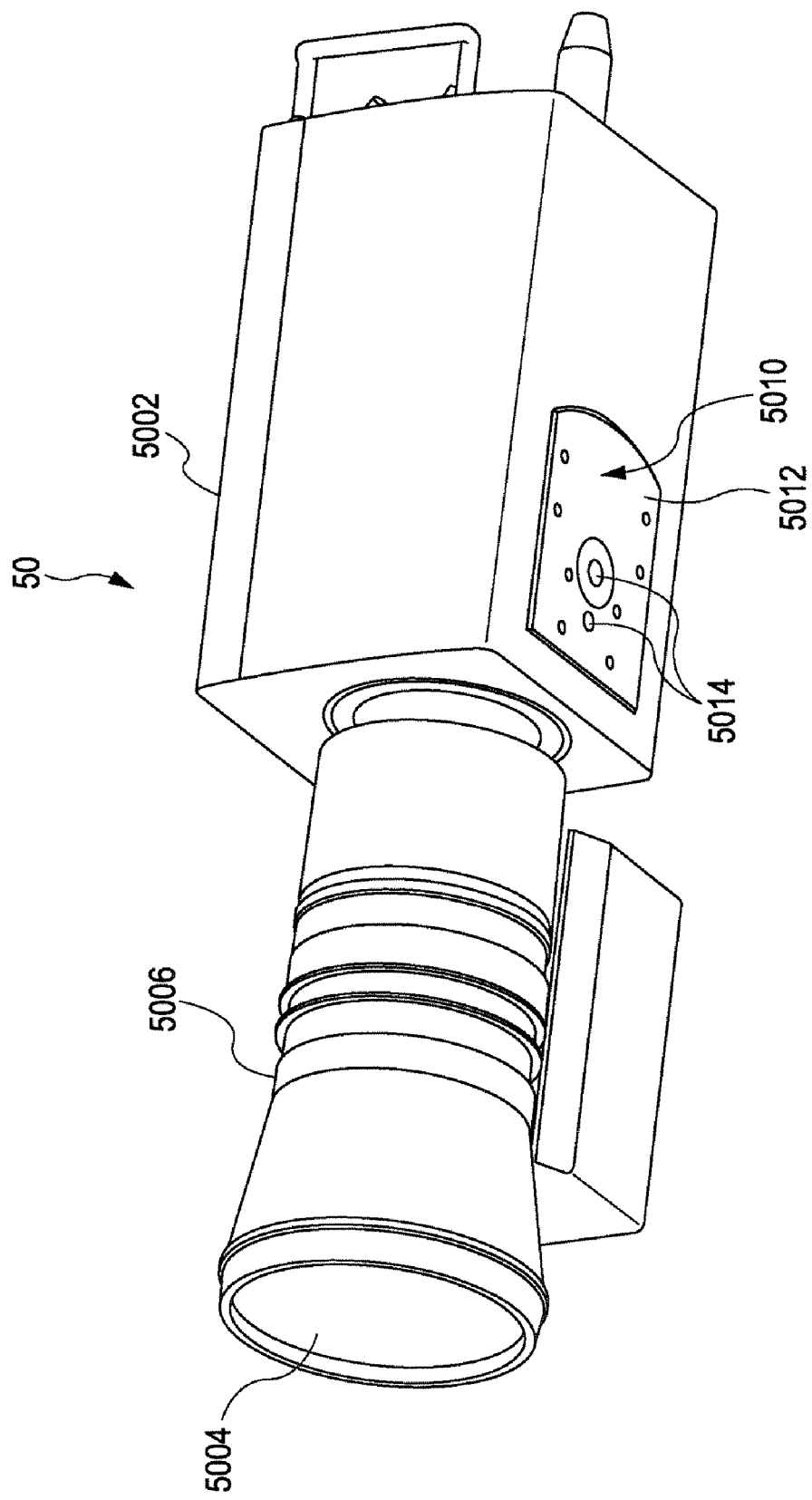
FIG. 20 is a perspective view of the camera.

FIGS. 18 and 19 are perspective views showing the construction of the portion near a camera 50 according to the second embodiment, and FIG. 20 is a perspective view of the camera 50. In the following description of this embodiment, the same components or parts as those of the first embodiment are denoted by the same reference numerals.

As shown in FIG. 20, the camera 50 includes a case 5002, a lens barrel 5006 protruding from the front surface of the case 5002 and accommodating a photographic optical system including a photographic lens 5004, and an imaging device (not shown) such as a CCD or CMOS accommodated in the case 5002 and imaging a subject image captured by the photographic optical system, and the like.

Since the case 5002 accommodates a signal processing circuit for performing such processing as converting a video signal output from an imaging device into video data of a predetermined format, a control circuit for controlling the focusing operation, zooming operation, and the like of the camera 50, and so on, the case 5002 of the camera 50 has an outer shape larger than that of the camera 12 according to the first embodiment.

A mounting plate portion 5010 for mounting the camera 50 onto a tripod head or the like is provided at the bottom of the case 5002. A flat mounting surface 5012 facing downward is formed in the mounting plate portion 5010. A plurality of mounting screw holes 5014 are formed in the mounting surface 5012. The mounting surface 5012 is formed with high precision with respect to the axis of the lens barrel 5006 and extends in the direction parallel to the axis of the lens barrel 5006.

Further, a connector 5020 for outputting an imaging signal output from the signal processing circuit, connectors 5022 for performing exchange of a control signal with the control circuit, and the like are provided to the rear surface of the case 5002. The connectors 5020 and 5022, and the control box 30 are electrically connected to each other via a cable (not shown).

As shown in FIGS. 18 and 19, the camera 50 is connected to the same rocking mechanism 20 as that in the first embodiment via a bracket 52, guide members 54 and 56, bearing members 58, and a fixing device 60.

The bracket 52 includes an upper plate 5202, front and rear plates 5204 and 5206 extending upright from the front and rear of the upper plate 5202, respectively, and two rods 5208 connecting between the lower ends of the front and rear plates 5204 and 5206.

A rotation adjusting mechanism 62, which is the same as the rotation adjusting mechanism 42 of the first embodiment, is provided in the upper surface of the upper plate 5202.

A cutout 5208, through which the lens barrel 5006 of the camera 50 and the case 5002 are inserted, is formed in the front plate 5204, and an opening 5210 through which the case 5002 is inserted is formed in the rear plate 5206.

As shown in FIG. 18, elongated holes 5240 extending laterally in an arcuate shape are formed at two locations on the right and left with the center of the lower part of the front plate 5204 therebetween.

Further, screw holes 5242 are formed on both right and left sides at the vertically intermediate position of the rear plate 5206.

It should be noted that as in the first embodiment, the bracket 52 is adapted to be rotatable about the rocking axis O1 on the bearing portion of the rocking mechanism 20.

As shown in FIG. 19, in the second embodiment, the guide members are provided at two locations including a location close to the rear portion of the lens barrel 5006 and the intermediation portion of the case 5002.

In the second embodiment, these guide members are attached onto the case 5002 through an intermediate plate 5020.

The intermediate plate 5020 is mounted to the case 5002 through threaded engagement of screws with the screw holes 5014. In the mounted state, the intermediate plate 5002 extends in the longitudinal direction.

The intermediate plate 5002 has first screw holes (not shown) provided at laterally spaced positions in the lower surface close to the front portion thereof, and has second screw holes (not shown) provided at laterally spaced positions in an end face facing rearward.

As shown in FIG. 19, the guide member 54 mounted at a location close to the rear portion of the lens barrel 5006 has a main body 5402 having a length that is larger in dimension than the width thereof.

A mounting member portion 5404 extends vertically downward from one side of the main body 5402 with respect to the lateral direction. A cylindrical surface 5406 extending in an arcuate shape in the direction of the length is formed in the lower surface of the mounting member portion 5404.

Further, screw holes 5408 are formed at both longitudinal ends of the mounting member portion 5404 so as to extend through the mounting member portion 5404.

The length of the guide member 54 extends in the direction perpendicular to the plane including the optical axis of the lens barrel 5006. The main body 5402 is attached onto the case 5002 through threaded engagement with the first screw holes of the intermediate plate 5020 by means of screws 5410.

With the guide member 54 being attached onto a mounting surface 5412 with the screws 5410, the cylindrical surface 5406 is located at the lower center on an imaginary cylindrical surface extending about the axis of the lens barrel 5006.

As shown in FIG. 19, the guide member 56 mounted at the intermediate portion of the case 5002 has an upwardly open U-shaped configuration, and has a rectangular inner surface 5602 formed in dimensions in conformity with the outer shape of the case 5002. Further, the guide member 56 has cylindrical surfaces 5006 respectively formed at two locations spaced (spaced by 120 degrees in this embodiment) from each other in the circumferential direction of an outer surface 5604 thereof.

Screw insertion holes 5608 in alignment with the second screw holes of the intermediate plate 5020 are formed on both sides in a lower part of the guide member 56, and elongated holes 5610 vertically extending in an arcuate shape are formed on both sides in an upper part of the guide member 56.

The guide member 56 holds the intermediate portion of the case 5002 by its inner surface 5602, and is attached onto the case 5002 by inserting screws 5612 into the screw insertion holes 5608 for threaded engagement with the second screw holes; in this state, cylindrical surfaces 5606 of the guide member 56 are located on both the right and left sides of the lower half portion of an imaginary cylindrical surface extending about the axis of the lens barrel 5006. That is, in this embodiment, the cylindrical surface 5406 of the guide member 54 and the two cylindrical surfaces 5606 of the guide member 56 are respectively provided at a plurality of locations of the case 5002 that are located in the lower half portion of the case 5002 and spaced apart from each other in the axial and circumferential directions of the lens barrel 5006.

As shown in FIGS. 18 and 19, in this embodiment, each bearing member 58 is composed of a bearing (roller). There are provided three bearing members 58, each of which is rotatably attached onto the front plate 5204 or the rear plate 5206 with screws.

As shown in FIG. 19, one bearing member 58 is provided at the lower central portion of the rear surface of the front plate 5204, and supports the cylindrical surface 5406 of the guide member 54 so as to be rotatable about the axis of the lens barrel 5006.

Further, the other two bearing members 58 are provided on both sides of the rear surface of the rear plate 5206 close to the lower part thereof; more accurately, the other two bearing members 58 are provided at laterally symmetrical positions with respect to the vertical plane passing through the optical axis of the lens barrel 5006, and support the cylindrical surface 5606 of the guide member 56 so as to be rotatable about the axis of the lens barrel 5006.

It should be noted that the bearing members 58 used are not limited to the roller bearing as described above but various known other structures such as slide bearing may be employed for the bearing members 58.

As shown in FIGS. 18 and 19, the fixing device 60 includes two screws 6002, the two elongated holes 5240 of the front plate 5204, the two screw holes 5408 of the guide member 54, two screws 6004, the two elongated holes 5610 of the guide member 56, and the two screw holes 5242 of the rear plate 5204.

That is, by bringing the two screws 6002 into threaded engagement with the respective screw holes 5408 via the elongated holes 5240, the guide member 54 (camera 12) is non-rotatably fixed to the front plate 5204 (bracket 52).

Further, by bringing the two screws 6004 into threaded engagement with the respective screw holes 5242 via the elongated holes 5610, the guide member 56 (camera 12) is non-rotatably fixed to the rear plate 5206 (bracket 52).

As shown in FIG. 18, the rotation adjusting mechanism 62 is constructed in the same manner as the rotation adjusting mechanism 46 according to the first embodiment, and is adapted to adjust the rotation of the camera 50 about the axis of the lens barrel 5006 with respect to the bracket 52.

The adjusting operation of the camera 50 of the imaging apparatus according to the second embodiment is identical to the adjusting operation according to the first embodiment. That is, the angle of the camera 50 about the axis of the lens barrel 5006 is adjusted so that the longitudinal sides of the contour of an image displayed on the display of the host device are parallel to the vertical axis of the chart (so that the transverse sides are perpendicular to the vertical axis). Once the adjustment of the camera 50 is complete, the guide member 54 (camera 50) and the front plate 5204 (bracket 52) are fixed by fastening the screws 6002 of the fixing device 60, and the guide member 56 (camera 50) and the rear plate 5206 (bracket 52) are fixed by fastening the screws 6004 of the fixing device 60.

The adjusting operation of the camera 50 of the imaging apparatus 10 is thus completed.

As in the first embodiment, in the second embodiment as well, by means of the simple construction in which the guide members 54 and 56 respectively having the cylindrical surfaces 5406 and 5606 are attached onto the camera 50, and the cylindrical surfaces 5406 and 5606 are supported on the bearing members 58 provided to the bracket 52 so as to be rotatable about the axis of the lens barrel 5006, the rotational position of the camera 50 about the axis of the lens barrel 5006 can be easily and reliably adjusted.

Accordingly, when, in particular, a plurality of image data are arranged in the vertical and horizontal directions and synthesized to produce image data covering a large area, this embodiment proves advantageous in obtaining image data of good quality suitable for synthesis of image data with no inclination with respect to the vertical or horizontal line.

Further, in this embodiment, there are provided a plurality of guide members, and the plurality of guide members are provided in the lower half portion of the lens barrel 5006 at a plurality of locations spaced apart from each other in the axial and circumferential directions of the lens barrel 5006. Accordingly, as in the first embodiment, the camera 50 can be rotatably supported in a stable manner, which is advantageous in easily and reliably adjusting the rotational position of the camera 50 about the axis of the lens barrel 5006.

While in this embodiment the description is directed to the case where the imaging apparatus 10 includes the rocking mechanism 20 and the turning mechanism 28, the present invention can of course be applied to an imaging apparatus 10 with the rocking mechanism 20 and the turning mechanism 28 omitted.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   a camera having a lens barrel incorporating an imaging device and a photographic optical system for introducing a subject image to the imaging device;
   a bracket for supporting the camera;
   a guide member attached onto the camera, the guide member having a cylindrical surface extending about an axis of the lens barrel in a state in which the guide member is attached on the camera;
   a plurality of bearing members provided to the bracket and supporting the cylindrical surface so that the cylindrical surface is rotatable about the axis of the lens barrel; and
   fixing means for fixing the camera to the bracket.

2. The imaging apparatus according to claim 1, wherein the guide member is attached onto an outer peripheral surface of the lens barrel.

3. The imaging apparatus according to claim 1, wherein the lens barrel projects from a case of the camera, and the guide member is attached onto the case.

4. The imaging apparatus according to claim 1, wherein the bearing members are rotatably attached onto the bracket.

5. The imaging apparatus according to claim 1, wherein a plurality of the guide members are provided, the plurality of guide members being provided at a plurality of locations spaced apart from each other in a circumferential direction of the lens barrel as seen in an axial direction of the lens barrel.

6. The imaging apparatus according to claim 1, wherein a plurality of the guide members are provided, the plurality of guide members being provided at a plurality of locations spaced apart from each other in an axial direction of the lens barrel and in a circumferential direction of the lens barrel.

7. The imaging apparatus according to claim 1, wherein a plurality of the guide members are provided, cylindrical surfaces of the plurality of guide members being provided in a lower half portion of the lens barrel at a plurality of locations spaced apart from each other in an axial direction of the lens barrel and in a circumferential direction of the lens barrel.

8. The imaging apparatus according to claim 1, wherein:
the lens barrel projects from a case of the camera, the guide member being attached onto the case;
a plurality of the guide members are provided, the plurality of guide members being attached onto the case; and
the plurality of guide members are provided at a plurality of locations of the case that are spaced apart from each other in a circumferential direction of the lens barrel as seen in an axial direction of the lens barrel.

9. The imaging apparatus according to claim 1, wherein:
the lens barrel projects from a case of the camera, the guide member being attached onto the case;
a plurality of the guide members are provided, the plurality of guide members being attached onto the case;
a plurality of the guide members are provided, the plurality of guide members being provided at a plurality of locations of the case that are spaced apart from each other in a axial direction of the lens barrel and in a circumferential direction of the lens barrel.

10. The imaging apparatus according to claim 1, wherein:
the lens barrel projects from a case of the camera, the guide member being attached onto the case;
a plurality of the guide members are provided, the plurality of guide members being attached onto the case; and
cylindrical surfaces of the plurality of guide members are provided in a lower half portion of the case at a plurality of locations of the case that are spaced apart from each other in a axial direction of the lens barrel and in a circumferential direction of the lens barrel.

11. The imaging apparatus according to claim 1, further comprising a rocking mechanism for rocking the bracket in a vertical direction.

12. The imaging apparatus according to claim 1, further comprising:
a rocking mechanism for rocking the bracket in a vertical direction; and
a turning mechanism for turning the rocking mechanism about a vertical axis.

* * * * *